United States Patent [19]
Rush et al.

[11] Patent Number: 6,119,102
[45] Date of Patent: Sep. 12, 2000

[54] MRP SYSTEM WITH VIEWABLE MASTER PRODUCTION SCHEDULE

[75] Inventors: Gary W. Rush; Herman J. Kiefus, both of Lafayette, Ind.

[73] Assignee: Made2Manage Systems, Inc., Indianapolis, Ind.

[21] Appl. No.: 08/787,253

[22] Filed: Jan. 24, 1997

Related U.S. Application Data

[60] Provisional application No. 60/015,975, Apr. 15, 1996.
[51] Int. Cl.$^7$ ............................................. G06F 17/60
[52] U.S. Cl. ..................................... 705/29; 705/8
[58] Field of Search ................... 364/468.05, 468.06, 364/468.13, 468.14; 705/7, 8, 29; 700/99, 100, 106, 107

[56] References Cited

U.S. PATENT DOCUMENTS

| | | |
|---|---|---|
| 4,459,663 | 7/1984 | Dye . |
| 4,646,238 | 2/1987 | Carlson, Jr. et al. . |
| 4,864,507 | 9/1989 | Ebling et al. . |
| 5,101,352 | 3/1992 | Rembert . |
| 5,197,001 | 3/1993 | Mukherjee . |
| 5,231,567 | 7/1993 | Matoba et al. . |
| 5,237,495 | 8/1993 | Morii . |
| 5,311,424 | 5/1994 | Mukherjee et al. . |
| 5,369,570 | 11/1994 | Parad . |
| 5,450,317 | 9/1995 | Lu et al. . |
| 5,479,343 | 12/1995 | Matoba et al. . |
| 5,548,518 | 8/1996 | Dietrich et al. . |
| 5,764,519 | 6/1998 | Tsukishima et al. . |
| 5,796,614 | 8/1998 | Yamada . |
| 5,818,716 | 10/1998 | Chin et al. . |

OTHER PUBLICATIONS

T. Lunn and S. Neff, MRP Integrating Material Requirements Planning and Modern Business, pp. 62–67, Section 2, Chapter 4 no date known.

T. Lunn and S. Neff, MRP Integrating Material Requirements Planning and Modern Business, pp. 212–215, Section 5, Chapter 13 no date known.

J. Orlicky, Material Requirements Planning, pp. 84–91, Processing Logic no date known.

B. Scott, Manufacturing Planning Systems, pp. 70 and 71, The MRP Process no date known.

S. Hill, UMI, Inc. ABI/INFORM, Hitchcock Publishing Co., Manufacturing Systems, Dec., 1995, pp. 3–7.

T. Vollmann, The Financial Times Limited; Financial Times, Nov. 10, 1995, pp. 11–16.

E. Miller, UMI, Inc. ABI/INFORM, Penton Publishing, Computer–aided Engineering, Nov., 1995, pp. 17–19.

R. Martin, UMI, Inc. ABI/INFORM, Institute of Industrial Engineers Inc., IIE Solutions, Nov., 1995, pp. 20–23.

J. Correll, Institute of Industrial Engineers, IIE Solutions, Jul., 1995, pp. 25–30.

D. Turbide, UMI, Inc. ABI/INFORM, Institute of Industrial Engineers Inc., IIE Solutions, Jul., 1995, pp. 31–36.

A. LaPlante, Forbes, Inc., Forbes, Oct. 10, 1994, pp. 37–44.

(List continued on next page.)

*Primary Examiner*—Robert A. Weinhardt
*Attorney, Agent, or Firm*—Ice Miller Donadio & Ryan

[57] ABSTRACT

An MRP system that operates on a single data set containing records for all item demands and supplies. The file may be opened under a demand alias and a supply alias to expedite MRP regeneration. A second item master extension file includes data for each item which is subject to MRP, which further contributes to improved MRP regeneration time. Item low level codes for an item are recalculated in real time whenever a bill of material referencing the item is created or modified. Therefore, low level codes need not be calculated during MRP regeneration.

8 Claims, 16 Drawing Sheets

OTHER PUBLICATIONS

M. Mozeson, Institute of Industrial Engineers Inc., Industrial Engineering, Dec., 1991, pp. 45–52.

G. Torkzadeh, Institute of Industrial Engineers Inc., Industrial Engineering, Jun., 1991, pp. 53–58.

M. Plourde, Hitchcock Publishing Company, Assembly Engineering, Apr., 1990, pp. 68–70.

T. Wallace, Penton Publishing Inc., Automation, Mar., 1990, pp. 71–77.

R. Smolin, Huebcore Communications Inc., Tooling & Production, Jul., 1989, pp.78–82.

Kim and Funk, A Knowledge–Based Expert Systems Approach to Schedule–Based Material Requirements Planning, 1990, pp. 98–101.

Figure 16

MRP SYSTEM WITH VIEWABLE MASTER PRODUCTION SCHEDULE

This application claims the benefit of U.S. Provisional Application No.: 60/015,975, filed Apr. 15, 1996.

FIELD OF THE INVENTION

This invention relates to systems for performing manufacturing requirements planning ("MRP"), which are software-based systems for performing time phased netting of manufacturing demands and supplies to generate action messages.

BACKGROUND OF THE INVENTION

The primary objective of a MRP system is to generate a schedule of net requirements and planned order releases for the component parts and materials that are needed to satisfy the end-product demand represented by a master production schedule. Prior systems, such as Rembert, U.S. Pat. No. 5,101,352, are of limited capability for a make-to-order manufacturer. Moreover, most MRP systems require an extensive time period to perform MRP time phased netting of item demands and supply to thereby generate MRP action messages ("MRP regeneration").

One factor that contributes to slow MRP regeneration times in prior systems is the calculation of item low level codes. Most prior art MRP systems store low level codes in data base structures for bills of materials. Because an item can be referenced in different bills of materials, an items low level code may be different for different bills of materials. For such prior art systems, each MRP run necessitates that each bill of material for each item which is subject to the MRP run be exploded and the different low level codes for each item reconciled. This is usually done by setting the low level code for each item, as represented in multiple bills of material, to the greatest low level code of the item for all bills of material for the run. For example, suppose there are three bills of material records for items widget-1, widget-2 and widget-3. A component of each widget may be a valve, but because the different bills of material may have different hierarchies, the low level codes for the valve may be 5 in the widget-1 bill of material, 22 in the widget-2 bill of material and 76 in the widget-3 bill of material.

For MRP regeneration, the valve low level code for each bill of material should be set to its greatest value, or 76. Moreover, suppose further that the valve itself comprised of subcomponents, such as, a valve manifold and a valve seal, which would have low level codes of 6, 23 and 77 for widget-1, widget-2 and widget-3, respectively. The low level codes of these subcomponents would have to be reset to 77 for purposes of the MRP run. It can be readily appreciated for an MRP run that processes many items, and when items may have bills of materials that are hundreds of levels deep and hundreds of levels wide, a considerable amount of processing time can be spent exploding bills of material and calculating and possibly resetting low level codes. This contributes to undesirably slow MRP regeneration speed.

SUMMARY OF THE INVENTION

An MRP system that operates on a single data set containing records for all item demands and supplies. The file may be opened under a demand alias and a supply alias to expedite MRP regeneration. A second item master extension file includes data for each item which is subject to MRP, and only those items subject to MRP, which further contributes to improved MRP regeneration time. Item low level codes for an item are recalculated in real time whenever a bill of material referencing the item is created or modified. Therefore, low level codes need not be calculated during MRP regeneration.

BRIEF DESCRIPTION OF THE DRAWINGS

Figure 1:
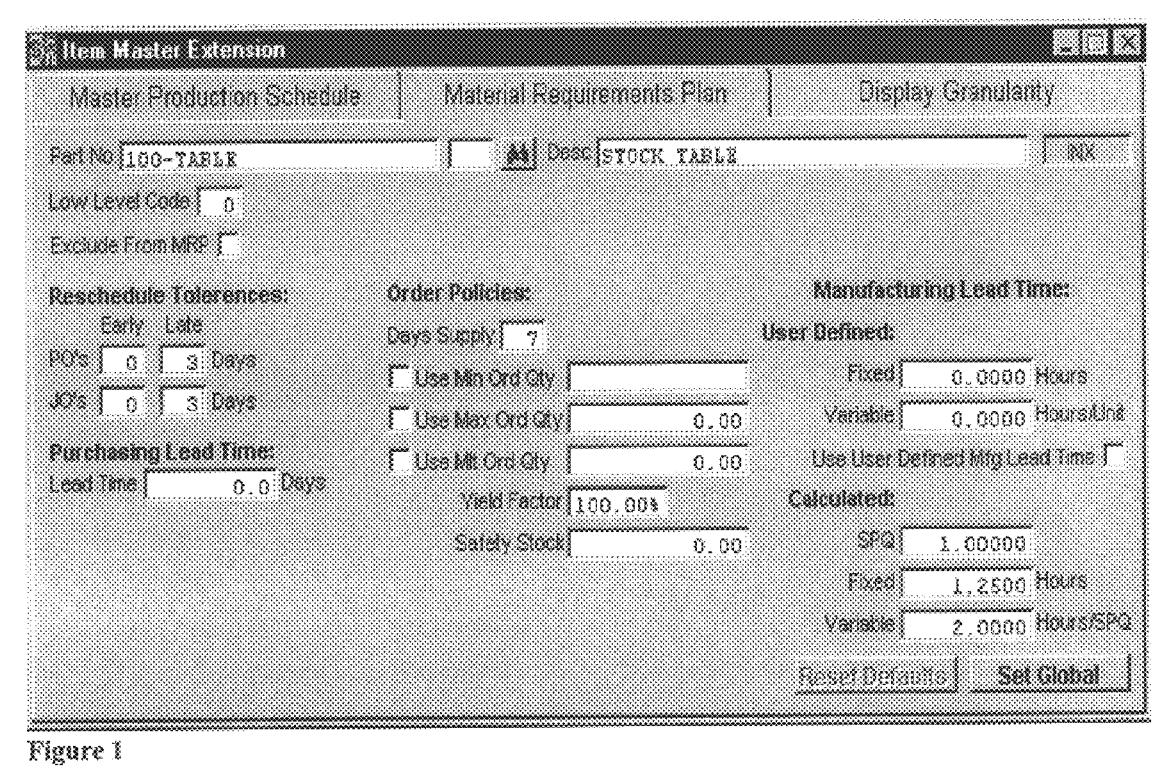

FIG. 1 shows a data entry screen displaying several values that may be specified for the item master extension record for an item.

FIG. 6 shows a screen which maybe used to display and edit MPS results after MPS regeneration.

FIG. 16 shows a screen for viewing the results of MRP regeneration.

DETAILED DESCRIPTION

Figure 2:
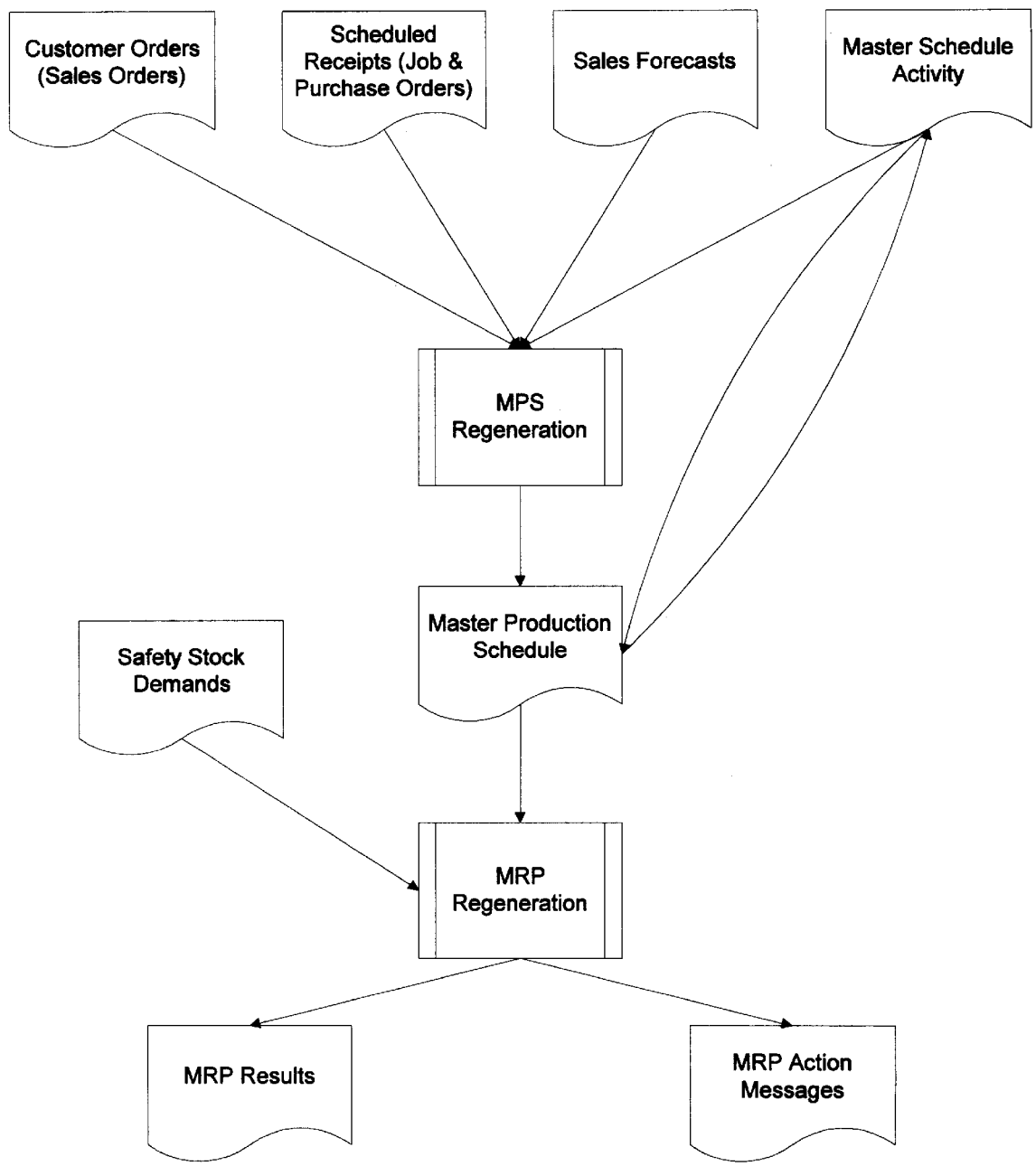
FIG. 2 shows an overview of the data files and processing sequence of an improved MRP system in accordance with the present invention.

In one embodiment of the invention, the system includes means for storing information regarding items. In general, an "item" is any individually tracked product, component or subcomponent. Many businesses also include in their item master files information regarding items which are not subject to the business' manufacturing operations, such as information for tooling or office supplies the business regularly purchases. Including such information in an inventory file can slow down the MRP process because the MRP process generally accesses every item in an item master file.

The present invention accommodates both make-to-order and make-to-stock manufacturers. A make-to-order environment is a direct-line progression. If an item on a sales order is a "make" item, then there is a one-to-one relationship created between that sales order and the job order created to fulfill that demand. Transactions processed against a make-to-order job order move all costs directly through Work In Process (WIP) and into Cost of Goods Sold (COGS) at the time the shipment is processed. This completion of manufacture of a make to order item does not impact on-hand quantities.

When the item on the sales order is a make-to-stock item, there is no direct link to a particular job order. The sales order creates a demand (commitment) against inventory to that item and an internal job is created to fulfill the inventory deficit. All costs related to jobs created for make-to-stock items will go from WIP to Inventory when the item is moved to finished goods. The shipment transaction then moves the costs from Inventory to COGS.

The system of the present invention allows a user to specify buy-to-order or buy-to-stock. If the item on a sales order or a job order is "buy-to-order," then there is a one-to-one relationship created between that sales order or job and the purchase order created to fulfill that demand. When the shipment transaction is processed against a sales order for a buy-to-order item, the costs are posted against a buy/resell account and COGS. When a purchase order is received which is linked to a job the costs are applied directly to WIP. The receipt transaction does not impact on-hand quantities.

When an item on a sales order or a job order is "buy-to-stock," then all transactions must flow through inventory. Essentially, the demand is against inventory and the purchase order actually replenishes inventory. The receipt of a purchase order for a buy-to-stock item increases on-hand quantities and costs are applied to the inventory account.

The term "standard," when applied to an item, indicates that the part number exists in the item master file, or non-MRP item data set. A standard Bill of Material may be specified via a sales/job order data entry user interface for a standard item. Only standard items may be added to a Standard Bill of Material. The term "non-standard" indicates that an item does not exist in the Item Master file. Non-standard items may be added to quotes, sales orders, jobs, and purchase order but not to a Standard Bill of Material. In one embodiment, the sales/job order data entry screen allows a non-standard item to be specified. The system is operable to copy a standard bill of materials record from the standard bill of materials data set and change and save the record as a new record in a sales order bill of materials file or job order bill of materials file. A sales order and job order may be mutually linked by including, in each record, a unique document identifying reference to other document. Accordingly, the system is operable to prevent a standard bill of materials data set record from referencing an item identifier unless there is a corresponding record for the same item identifier in the non-MRP item data set.

Several other terms used herein are defined as follows.

Demand: What the user of the MRP system needs to make or buy. Independent demand comes from sales orders, forecast or Master Schedule. Dependent demand is component demand created by demand placed on a parent item.

Master Production Schedule (MPS): A statement of what quantity needs to be produced on what date to support the independent demand, i.e., sales orders and forecast. In one embodiment of the invention, the MPS is represented by an MPS data set.

Low Level Code: The deepest level at which the item is found in any product bill of material. In the preferred embodiment, the low level code is not entered by the user, but is automatically calculated by the system as described below.

Time Buckets or Granularity: A time frame, such as day, week or month, which is defined so that requirements can aggregated and order policies can be applied consistently.

Gross Requirements: Quantity of all demand for a particular item within a specific time frame.

Planned Orders: The suggestion from MRP that a replenishment order needs to be placed to satisfy a particular demand. This suggestion is quantity and date specific.

Scheduled Receipts: Existing Open jobs or purchase orders which are quantity and date specific.

Purchase Lead Time: The time in which it takes to acquire a purchased part.

Manufacturing Lead Time: The time required to produce a manufactured part, which includes setup, production, move, queue and outside operations.

Cumulative Lead Time: This is calculated for a manufactured part and is the total back to back lead times of the longest lead time components in all levels of the assembly process.

Lead Time Offset: This is a term used to describe the activity of subtracting the lead time of an item from its due date to arrive at either a manufacturing start date or purchase order release date.

Bill of Material Explosion: Calculation of the quantity required for every component on a bill of material based on quantity per times the gross requirement of the parent.

Safety Stock: A quantity of inventory which is required to be on-hand at all times. MRP will consider this quantity to be a permanent demand and plan orders to maintain that quantity at all times.

Pegging: A term given to the activity of tracing demand back to its parent or forward to its component demand.

Reschedule Tolerance: A specified time frame usually expressed in days that tells the MRP system not to generate an action message if a variance occurs within this time frame. This helps reduce system "nervousness."

Nervousness: A term used to describe the ripple effect caused when changes to demand create multiple and frequent lower level action messages.

Order Policies: User defined parameters which govern how MRP arrives at the number of, and quantity appearing, on each planned order.

One feature of the present invention is the use of an item master extension file, or item MRP data set, in addition to the item master file, or item non-MRP data set. The item master file, which is used in one embodiment of the present invention and in most prior MRP systems, is used to store most of the data relative to items, or parts, such as part name, part number (a/k/a unique item identifier), part supplier and price information (for parts which are purchased), etc. Item master files tend to have very large record layouts because a great deal of information is stored (or at least capable of being stored) regarding each item or part, including non-MRP data. However, some of the information related to parts is used exclusively during the MRP process. In one embodiment of the present invention, all of this MRP specific data (except for the inventory quantity) is stored in a separate item master extension file. The item master extension file contains data such as an MRP exclude flag, a low level code, maximum order flag, minimum order flag, etc. The record size for the item master extension file is much smaller than it is for the item master file. Because item information is accessed frequently during the MRP process, by storing all MRP-related data in a separate item master extension file, various database access parameters, such as buffer sizes, can be used more efficiently, thus improving MRP regeneration times.

Another reason the item master extension file improves MRP regeneration times is because in a make-to-order environment, a business may accept many orders for non-standard configurations of standard items. For example, a business's standard bill of materials may include an item, for say, a binder with a brown leather cover. However, in a make to environment, a business may have customers that want to purchase, on a one-time basis, for example, a binder with a red leather cover or a blue plastic cover, or any other number of variations. Many prior art MRP systems would require the business to create a new "standard" bill of materials for these variations. However, it is cumbersome to create a new standard bill of materials, especially in view of the fact that the variation may be the subject of only a single order. Thus, in prior art systems, the item master file and the standard bill of materials files become bloated with many old items that are unlikely to ever be ordered again. These increased file sizes tend to increase MRP processing times because, each record in the item master file is typically accessed at some point during the MRP process. In a typical MRP run, the number of items that are actually the subject of existing demands or supplies is frequently much smaller than the number or records in the item master file. Therefore, in prior MRP systems which access each record of the item master file, much time is wasted accessing all the records which will not be subject to MRP.

The use of the item master extension file speeds MRP because it only contains records for those items which are subject to MRP, and as a result, it usually has fewer records than the item master file. By relying primarily on the item master extension file, instead of the item master file, to "drive" the MRP process, the MRP regeneration time is accordingly reduced.

Another advantage of the item master extension file is realized in the course of utilizing other portions of software typically found in a manufacturing environment, such as a sales order module, or any other module that permits a user to view or "browse" the records of the item master file. As explained above, many prior art systems require the user to create item master records for "one-time," or "non-standard" make to order, sales, and this tends to "bloat" the item master file with items that will probably never be ordered again. Nevertheless, users, such as sales persons entering new sales orders, will browse the item master file to find the particular item a new customer wishes to order. Such salespersons will have to wade through all of the 'non-standard" items in the item master file. Because they must sort through a larger amount of irrelevant records, they will not be as efficient in performing their jobs.

In one embodiment of the present invention, "non-standard" items are implemented by: (a) permitting sales orders, job orders or purchase orders to specify an item identifier that is not in the item master file; and (b) prohibiting a standard bill of materials from referencing a "non-standard" item, and requiring instead non-standard items to be specified in a separate job order bill of materials file. In one embodiment of the present invention, there are three bill of materials files: a standard bill of materials file, a job order bill of materials file, and a sales order bill of materials file. As the names suggest, the standard bill of materials file contains information only about "standard" items (and their subcomponents), and there will always be a corresponding item master record for each top-level item in the standard bill of materials file. A sales order may, however, define a unique, or non-standard, bill of materials, as in the above example of a binder with a blue plastic cover instead of a brown leather cover. In such an instance, one embodiment of the system of the present invention would create a new job order bill of materials record for the new "blue plastic notebook" item, and during this process, a new item master extension record for the new "blue plastic notebook" item will also be created. However, a new item master file record will not be created, nor will a standard bill of materials record be created for the new blue plastic notebook item. To the extent the system becomes "bloated" with information about the new blue plastic notebook (or other similar non-standard or make to order items) the "bloating" occurs in the job order bill of materials file and the item master extension file. However, these files are accessed far less frequently on a day to day basis than the standard bill of materials file and the item master file. Moreover, it is less disruptive to day to day operations to periodically "clean out" these files to eliminate records for one-time items that are no longer needed.

The full record layout for the item master extension file in one embodiment of the invention may be as follows:

| FIELD | TYPE | LEN | DEC | DESCRIPTION |
| --- | --- | --- | --- | --- |
| FCPARTDS | C | 35 | 0 | Part Description |
| FCPARTNO | C | 25 | 0 | Part (Item) Number |
| FLEXCMRP | L | 1 | 0 | MRP Exclude If .T. this part will be excluded from the MRP process. |
| FLMAXORD | L | 1 | 0 | Max Order Flag If .T. and fnMaxOrd is non zero, will limit maximum order size. |
| FLMINORD | L | 1 | 0 | Min Order Flag If .T. and fnMinOrd is non zero, will govern minimum order size. |
| FLMLTORD | L | 1 | 0 | Order Multiple If .T. and fnMltOrd is non zero, will insure that the order is an exact multiple of fnMltOrd. |
| FLUSEFIX | L | 1 | 0 | Use Fixed Mfg Lead Time |
| FNCPLEAD | N | 10 | 4 | Critical Path Lead Time |
| FNDAYSUP | N | 3 | 0 | Days Supply Aggregates all requirements for number of days specified to be placed on a single order. |
| FNFIXMFG | N | 10 | 4 | Mfg Variable portion of user defined Mfg lead time |
| FNFIXSU | N | 10 | 4 | Fixed portion of user defined Mfg lead time |
| FNJOETOL | N | 3 | 0 | JO Early Days (Days JO can be early) |
| FNJOLTOL | N | 3 | 0 | JO Late Days (Days JO can be late) |
| FNLEVEL | N | 3 | 0 | Low Level Code |
| FNMAXORD | N | 10 | 4 | Max Order Quantity |
| FNMINORD | N | 10 | 4 | Min Order Quantity |
| FNMLTORD | N | 10 | 4 | Order Multiple |
| FNPOETOL | N | 3 | 0 | PO Early Days (Days PO can be early) |
| FNPOLTOL | N | 3 | 0 | PO Late Days (Days PO can be late) |
| FNPTMODEL | N | 3 | 0 | Pass Through Model Determines what portion of ID, IF, or MS quantities that pass into the MRP process. May be viewed as forecast consumption. |
| FNVARMFG | N | 10 | 4 | Variable potion of calculated mfg lead time |
| FNVARSU | N | 10 | 4 | Fixed portion of calculated mfg lead time |

In one embodiment, data fields for many of the item master extension record can be entered via the Master Production Schedule tab for the Item Master Extension data entry screen. The data fields have the following meanings.

The MRP Pass Through determines how demand, forecast and Master Schedule Qty. will be used to yield the final demand that MRP will use. MPS demand will be aggregated based on the bucket size or granularity defined for the item. In one embodiment, the default MRP Pass Through is Greater of: Demand or Forecast. Other possible pass-though models which may be specified are as follows.

Master Scheduled Item: Pass only the Master Schedule quantity entered into the MPS Calendar.

Demand Only: Pass only demands originating from Sales Orders.

Forecast Only: Pass only the Forecast quantity entered into the MPS Calendar.

Greater Of: Demand or Forecast: Compare the sum of forecast with sum of demand for each bucket and pass the higher number to MRP.

Exclude from MRP: Checking this box excludes this item from MRP even if there is demand for the item. Default is unchecked.

Reschedule Tolerances: Allows users to establish a "window" during which MRP will not create reschedule messages for the item. This will reduce number of messages and reduce MRP "nervousness."

Early=The number of calendar days a receipt date can be earlier than required date without generating a reschedule message. Default is 0.

Late=The number of calendar days a receipt date can be later than required date without generating a reschedule message. Default is 3.

Purchasing Lead Time: The number of calendar days between placing an order and the receipt of purchased material. MRP uses this to determine action date for new planned purchase orders. Default is item master setting.

Order Policies: These values will determine how MRP aggregates demands and determines order quantities.

Days Supply: Number of days from the occurrence of unmet demand that you want the system to look ahead for additional demand. Default is 7 calendar days.

Minimum Order Quantity: Minimum quantity that is allowed on a planned order. Default is unchecked.

Maximum Order Quantity: Maximum quantity that is allowed on a single planned order. Default is unchecked.

Multiple Order Quantity: Planned order quantity must be divisible by this number. This may cause planned qty. to be greater than the actual demand or greater than the maximum. Both Maximum and Minimum should be relative to the multiple order quantity. Default is unchecked.

Yield factor: The percentage of yield for receiving this product. This percent multiplied by 100, is divided into the demand quantity after applying min/max policies. Multiple rules will be applied last. Defaults from item master setting.

Safety Stock: The amount of inventory to be on-hand at all times. Defaults from item master setting. MRP views safety stock as immediate demand, if the user elects to include safety stock when generating MRP.

Manufacturing Lead Time: MRP will use calculated values unless user defined Manufacturing Lead Time box is checked.

In one embodiment of the invention, the inventory on-hand field is stored not in the item master extension record, but in the item master file. This is because MRP systems are frequently one component of a larger manufacturing information system, and inventory on-hand is an important data field for other modules of the system. Storing inventory on-hand data in the item master file makes it possible for the MRP portion of the information system be to kept in its own module, such that all data and software for MRP can generally be isolated in discrete program and data files. Although inventory on-hand is a data field that may be accessed during MRP, the system still provides for an efficient MRP process as described below.

Some items in the item master file will not have corresponding records in the item master extension file. This will be true for items which are not subject to MRP, such as buy-to-order items, bulk order items, tooling or a business' office supplies. For items that do not have Item Master Extension records, one is automatically created with default settings if the item is referenced during any of the following procedures: MPS Regeneration, MRP regeneration, or Reset Low Level Code. MPS will only generate for items with demand; MRP will only generate for items that have demand; and Reset Low Level Code will generate for all standard items. After the initial build, all items which have a standard bill of materials or are components of a standard bill of materials will also have an item master extension record. The item master extension is created when the standard BOM is added and as components are added to a standard BOM. Only purchased items with a low level code of zero will not have an item master extension created after the initial build.

Overview of MRP Regeneration

An overview of the MRP process in one embodiment of the present invention is shown in FIG. 2. Like most prior MRP systems, the MRP system begins by creating a master production schedule, or MPS. The MPS is a data set indicating what quantity needs to be produced on what date to support the independent demand, i.e., sales orders, job orders and forecasts. Four data set files are used to create the MPS: customer orders (sales orders), scheduled receipts (job and purchase orders), sales forecasts and master scheduled activity. After MPS regeneration has occurred, the user may regenerate MRP. The MRP process uses the MPS table to calculate MRP. The outputs of MRP regeneration are an MRP results data set and MRP action messages.

Figure 4:
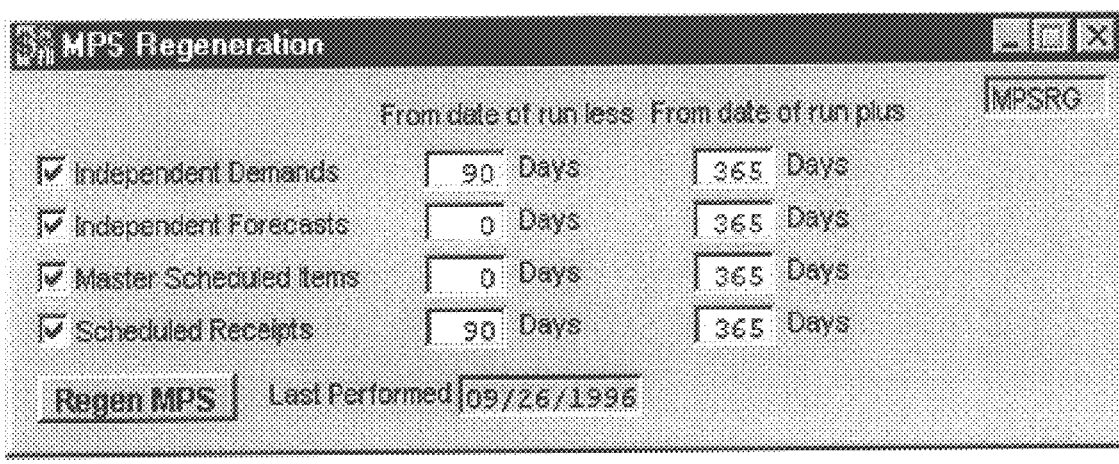
FIG. 4 shows a data entry screen for specifying variables for regenerating a master production schedule.

From the end user perspective, begins the process by selecting the MPS Regeneration parameters as shown in FIG. 4. This screen allows the user to select the time frame and which categories of transactions should be included in the MPS run. The MPS regeneration options are as follows From date of run less: number of days prior to run date that MPS should consider demand. The first MPS should attempt to catch any past due Sales Orders with no scheduled receipts by setting this field to a value greater than zero. Past due receipts should not be considered unless past due demand is considered. Past due forecasts and Master Schedule Quantities are not usually considered.

From date of run plus: Number of days from run date into the future that MPS should consider demand.

Independent Demands: All OPEN Sales Orders with due dates which fall within the specified range.

Independent Forecasts: A Forecast quantity can be added via the MPS calendar for any item for any day. This capability is especially useful for those companies where the Sales Order lead time quoted is less than the accumulated lead time of the item. The forecast should come from the Sales Department.

Master Schedule Items: A MPS Quantity can be entered in to the MPS calendar for a specific day. A Master Schedule quantity over-rides all other demand for that item. By entering a quantity, the user is manipulating demand in order to manage production resources.

Scheduled Receipts: Purchase order and job order pending receipts of items used in conjunction with inventory to determine projected available and available to promise. The sales order demand and receipts in MPS are only valid for the moment it is run. The frequency of MPS Regeneration is strictly dependent on how dynamic the environment is.

Figure 3:
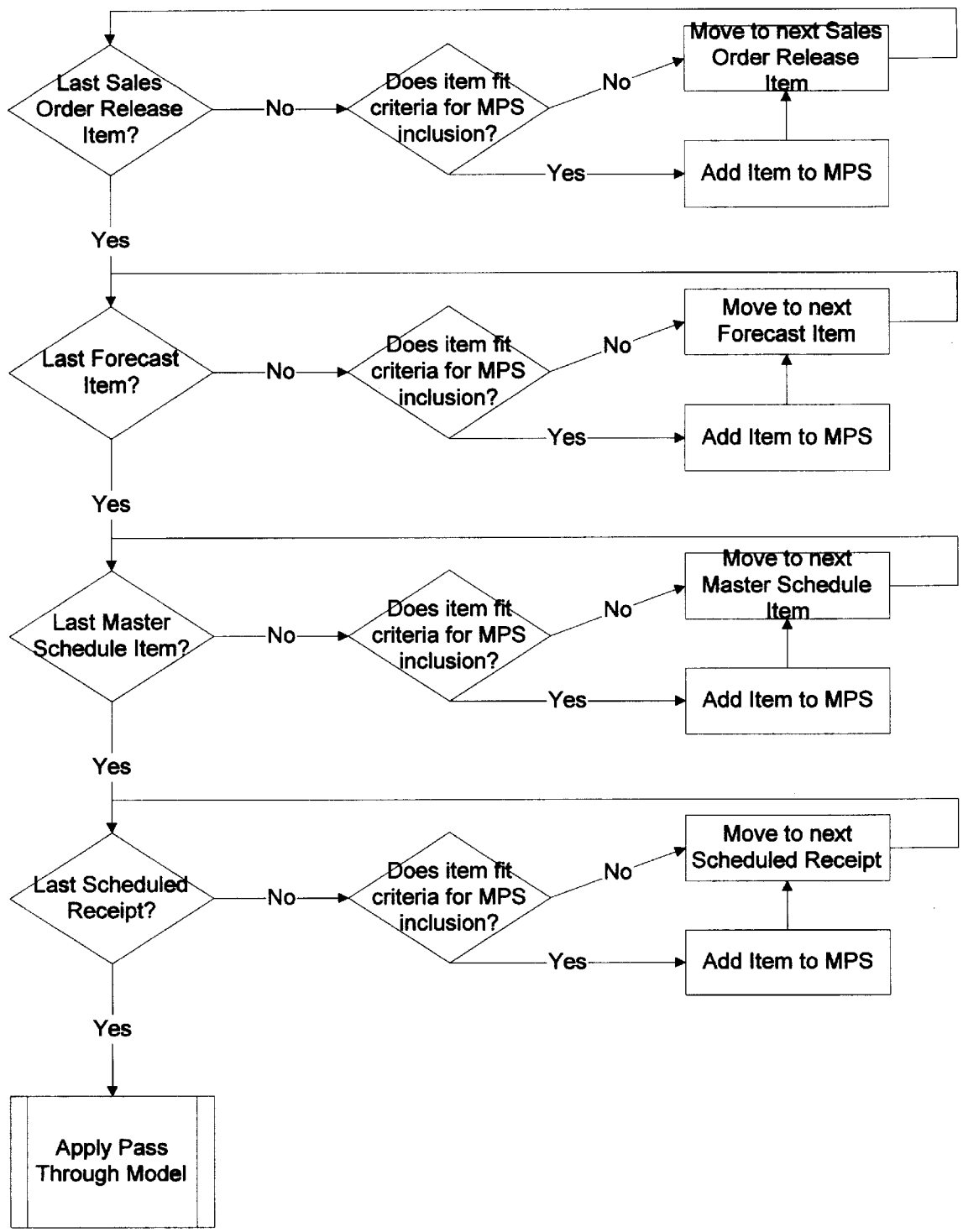
FIG. 3 is a flowchart showing the criteria for including item demand and supply records in an MPS data set.

After the MPS parameters are selected, the system generates the MPS in accordance with the logic shown in FIG. 3. Assuming the user selects all the parameters for inclusion in MPS as set forth above and in FIG. 4, the system begins by creating an MPS file. It will be appreciated by those of skill in the art that in accessing a demand or supply data file, not all records therein will necessarily by used to generate the MPS. First, some data files may be excluded entirely based on the MPS regeneration parameters selected by the user as specified above. In addition, only records indicating item demands or supplies may be included based on the selected parameters. Finally, depending on how the MRP system has been designed, further demand or supply records may need to always be excluded from MPS regeneration. For example, job orders represent a source of demand for MPS. However, a job order may have one of a number of different statuses. In one embodiment of the present invention, a job order may have a status of started, opened, released or completed (all of which constitute "active" job orders), or on hold, or canceled (all of which are "inactive" job orders). For a system of such a design, even though all the job orders may be contained in a single file, only the "active" job orders would be subject to MPS or MRP. Those of skill in the art could easily utilize a different system, for example, where all active job orders which may be subject to MPS/MRP are stored in a file separate from all inactive job orders.

Likewise, purchase orders could have statuses of started, awaiting approval or open or closed (which are considered active) or canceled or on-hold (which are considered inactive). Sales orders may have an opened status (which are considered active) or started or closed (which are considered inactive). For the purposes of this application and the claims, the set of demand and supply documents used to generate MPS/MRP includes only active documents, regardless of what file structure or system may be used to store such documents.

In the preferred embodiment, the MPS table includes an index for its item identifier field. The system builds the MPS table by first copying all item demands, (in one embodiment, as represented by sales orders, sales forecasts and master scheduled activities) and copying information about each order into the MPS table. For item demands, the MPS data set field FLPASSTHRU is set to false. This means that the record will be displayed to the user after the MPS data set has been created. After all demands have been copied into the MPS table, each supply record (in the preferred embodiment, as represented by job orders and purchase orders) is examined. For each supply record (document) examined, the system performs a seek on the MPS data set being built to determine whether demand records for that item already exist in the MPS data set. If no demand records exist, the MPS data set field FLPASSTHRU is set to true for that supply record. If a demand does exist, FLPASSTHRU is set to false.

Referring again to FIG. 3, first, all active sales orders are reviewed to determine whether the item which is the subject of the order fits the criteria for inclusion in MPS. These criteria are whether the sales order is "active" as specified above, and whether the date of the sales order is within the time frame selected by the user. The time frame may be specified by the MPS regeneration screen, as shown in FIG. 4. If a sales order item meets the criteria for inclusion in MPS, a record is inserted into the MPS data set. The same process is repeated for item forecasts, master scheduled items, and scheduled receipts (job orders or purchase orders). For each such demand or supply document, the key information copied into the MPS record are the item number, quantity, and transaction date. A representative file layout for storing data regarding item forecasts and master schedules is as follows.

| FIELD | TYPE | LEN | DEC | DESCRIPTION |
|---|---|---|---|---|
| FCPARTNO | C | 25 | 0 | Part (Item) Number |
| FCTXNTYPE | C | 2 | 0 | Transaction Type either (F (forecast) or MS (master schedule) |
| FDTXNDATE | D | 8 | 0 | Transaction Date |
| FMNOTES | M | 4 | 0 | Notes |
| FNTXNQTY | N | 10 | 4 | Transaction Date |

In one embodiment, additional information is also specified in the MPS data set as follows:

FCDOCITM is set to the item number (a/k/a line number) of the source document on which the demand/supply occurs.

FCDOCNO is set to the document number of the source document on which the demand/supply occurs.

FCDOCRLS is set to the release number of the source document on which the demand/supply occurs.

The FCDOCTYPE field is set to an abbreviation for the type of document from which the demand or supply originated: SO for sales order, JO for Job order, PO for purchase order, IF for independent forecast, or MS for a master scheduled item.

FCPARTNO is the unique item identifier, or part number.

FCSOURCE is set to the source of issue as specified in the source document for the item, and may be an M for make, B for buy, or S for stock (inventory).

FCTXNTYPE is set to an abbreviation for the type of the transaction represented by the demand or supply, namely, ID for independent demand, IF for independent forecast, MS for a master scheduled item, and SR for scheduled receipt. (The field of the same name in the MRP table, as discussed below, may also have an additional value, DD, for dependent demand.)

FDTXNDATE is the transaction date for the item from the source document. For supplies, the date reflects the expected date of receipt, and for demands, the date the item needs to be available to fulfill the demand.

FLPASSTHRU is a logical flag set to TRUE for supply transactions which should be suppressed in viewing MPS results. These will be only those supply transaction items for which there are no demand records for the same item. This field is always FALSE for demand records.

FNMRPQTY is set to be equal to FNTXNQTY for supply records. For demand records, this field is set to the FNTXNQTY after taking into account the pass through model for the item (e.g., greater of demand or forecast). The pass through model for the item is specified in the item master extension file.

FNTXQTY is set to be equal to the quantity for the item in the source document.

The one embodiment, all item demand and supply data sets may be processed sequentially to build the MPS data set, preferably, by utilizing, for each item demand and supply data set, a filtered index that accesses only those records that are "active," as that term may be defined by the particular MRP system, and which fall within the time period specified by the user. This is especially efficient in the form of disk seeks, packet sizing and utilization of buffers on the network server. Therefore, this method of building the MPS table contributes to fast processing speed of the system. In contrast, some prior MRP systems, after gathering all item demands, then perform searches to find supply records for those items for which demands exist. These will be random searches, which will not take advantage of efficiencies available via sequential file access.

It will be appreciated by those of skill in the art that it is unusual to create the MPS using item supply documents, such as job orders and purchase orders, as most MPS systems only access item demand documents in creating the MPS. In one embodiment, the system of the present invention includes supply information in creating the MPS data file, but suppresses display of such supply information when permitting the end user to browse and edit the MPS data set. The supply information is gathered during the MPS stage, because, as explained further below, this makes it unnecessary to access this information during the MRP process, which results in improved MRP regeneration times. The system accomplishes this by inserting all demand records into the MPS table before inserting any supply records. Therefore, as a supply record is added, a seek on the item number may be performed to determine whether there are already any demand transaction for that part. If there are none, then the FLPASSTHRU flag is set to TRUE for the supply record, which causes the record not to be displayed when the MPS results are ultimately viewed.

Figure 5:
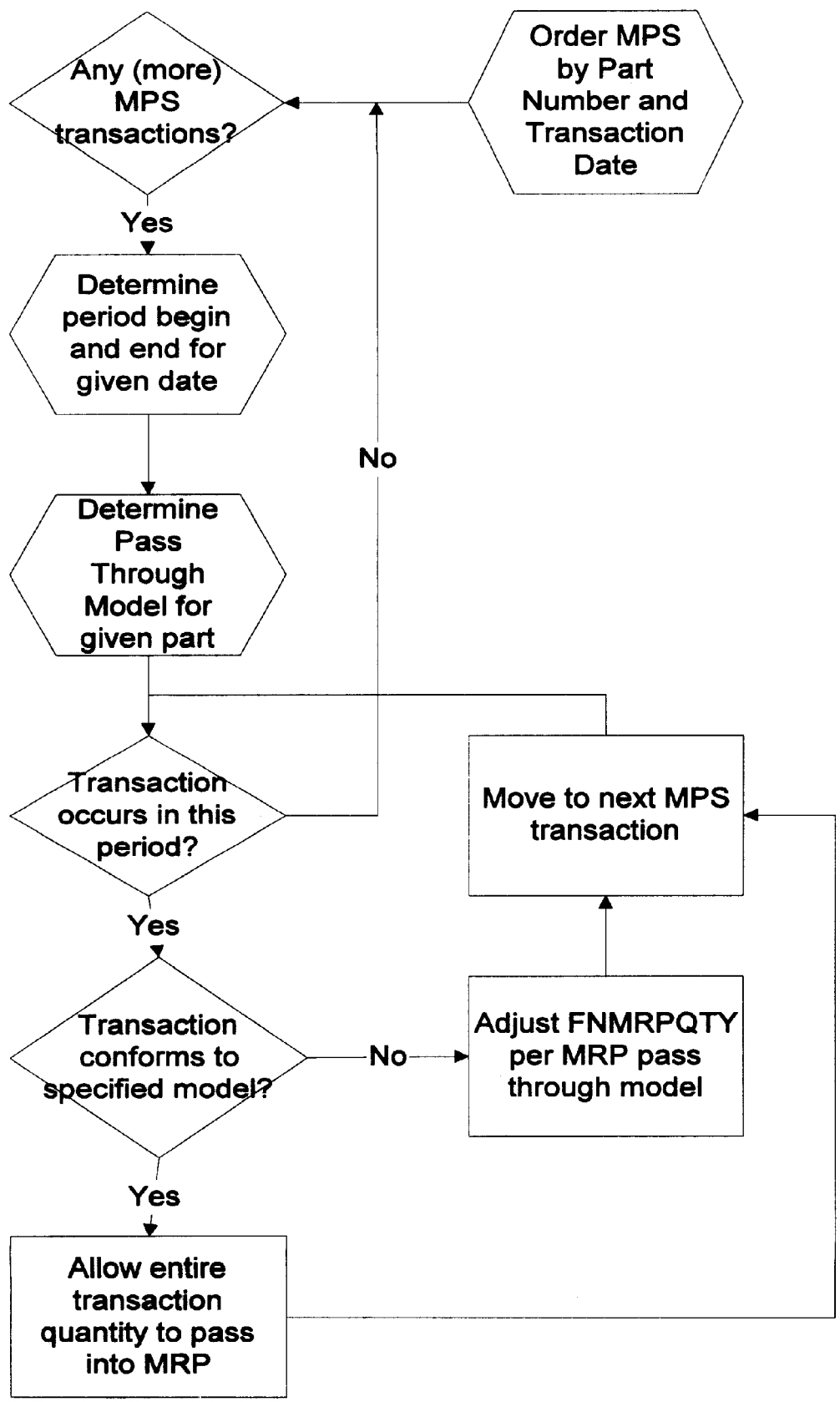
FIG. 5 is a flowchart showing the application of an item pass through model for adjusting an item quantity for the MPS data set.

FIG. 5 shows how the MRP pass through model may be implemented. This process sets the FNMRPQTY field for each record in the MPS data set. Specifically, all transactions for a particular item that fall within the specified bucketed time frame are accumulated. Then, it is determined whether the transactions conforms to the specified MRP pass through model, (e.g., greater of demand or forecast). As noted above, for supply transactions, the value in FNTXQTY will always be copied into the FNMRPQTY field. Otherwise, the FNMRPQTY may be adjusted in accordance with the MRP pass through model. There are many pass through models known in the art, and the particular model selected does not form a part of the invention per se, although permitting a different pass through model to be specified for each item is an advantage of the present invention.

After the MPS pass though model(s) have been applied, the MPS table (data set) is complete and available for browsing or editing by the end user. However, in one embodiment of the invention, any MPS data set record for which the pass through flag (FLPASSTHRU) has been set, the display of such records is suppressed in displaying the MPS results. This is because, from the user's perspective, MPS exists only to permit viewing and editing of top-level item demands. Item supplies are normally taken into account only during the MRP process. However, because all supplies have been gathered during the MPS step, this supply data will be readily available during the subsequent MRP regeneration.

Figure 6:
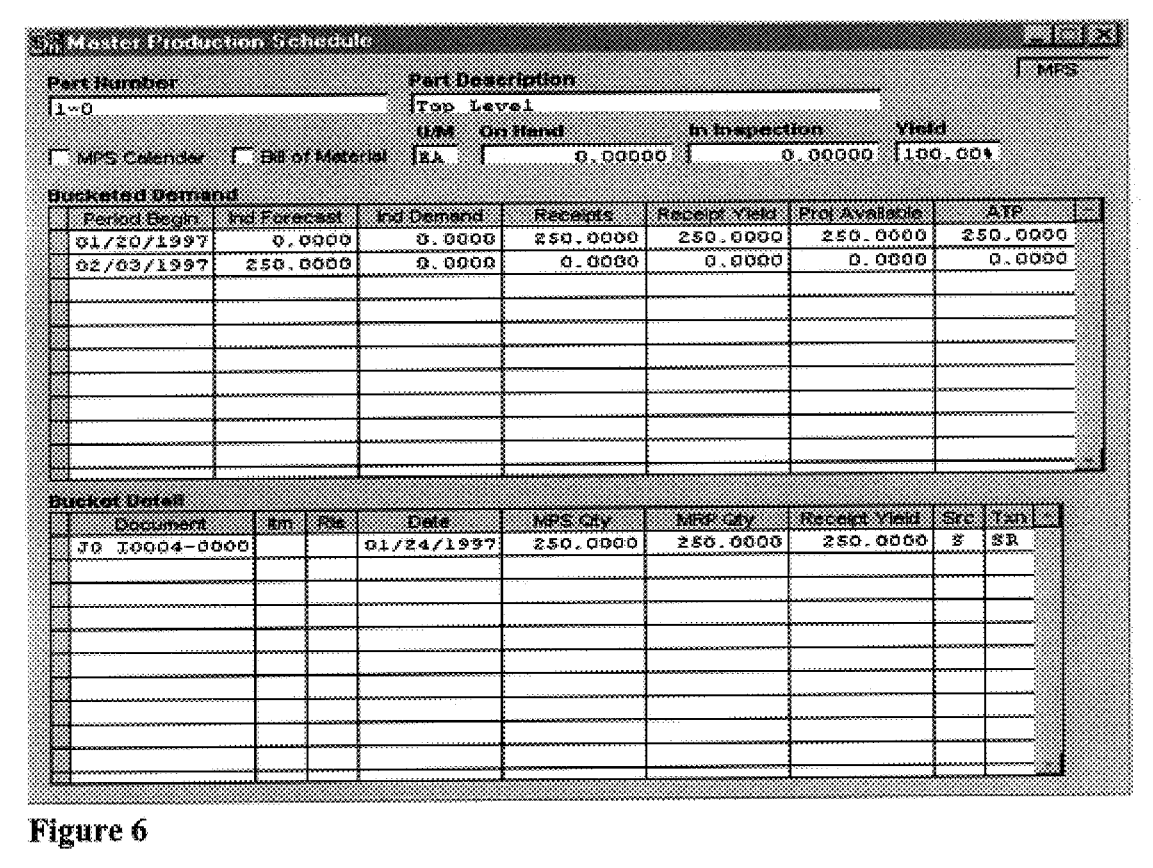

The MPS results may be viewed using a screen shown in FIG. 6. As shown, the Bucketed Demand is displayed in aggregate based on the bucket size defined in the Display Granularity Tab of the Item Master Extension and the Bucket Detail displays the individual demands for a specific bucket.

The Bucketed Demand grid displays information for Stock items only. The first line will display all past due transactions. The bucket size can be changed by right clicking and editing the display granularity settings for the item. The information displayed in FIG. 6 is as follows:

Period begin: First date of the week/month/year depending on the display granularity setting for the bucket.

Ind Forecast: Sum of all Forecast demand will be displayed.

Ind Demand: Sum of all Sales Order demand or Master Schedule demand.

Receipts: Includes all pending Jobs and PO's where the due date falls within the time bucket. Planned Orders are not displayed in MPS results.

Receipt Yield: The number relative to the expected receipt quantity after applying the part yield factor.

Projected Available: (On-hand+Qty. in inspection+receipts)—Forecast and Independent demand. The projected available from the previous bucket becomes the on hand of current bucket. Projected Available is cumulative.

ATP (Available to Promise): (On hand+Qty. in inspection+receipts)—Independent Demand. Qty. on hand is assumed to be zero after first bucket. ATP is calculated bucket by bucket and is non-cumulative. Independent Forecast is not used in the ATP calculation.

The Bucket Detail portion of the screen displays the individual transactions comprising the bucket being pointed to in Bucketed Demand portion of the screen. Each individual demand or supply is displayed. The following table identifies what the Document field may contain.

| Document | Demand or Supply | Source |
| --- | --- | --- |
| SO | Independent Demand - Open SO | Sales Order Module |
| IF | Independent Forecast - Manual Input | MPS Calendar |
| MS | Independent Demand - Manual Input | MPS Calendar |
| JO | Scheduled Receipt - OPEN/REL Job | Shop Floor |
| PO | Scheduled Receipt - OPEN PO | Purchasing |

All documents may be followed by a number. SO, PO and JO display the actual relative document number. MS and IF display a system generated ID number. The item sequence and release number will be displayed where relevant. The other columns in this grid are as follows:

Date: Due date

MPS Qty.: Actual transaction Quantity included in the MPS

MRP Qty.: Qty. that MRP will use based on MRP Pass through module.

SRC: M=Make, B=Buy, S=Stock

TXN: Indicates the type of transaction, i.e., IF=Ind. Forecast, ID=Ind Demand etc.

Right clicking on the document field will access the record generating demand. In one embodiment of the system, each user must identify him or herself to access the system, and each user may be designated to view or modify various types of data in the system via different permission levels. If the user has permission, forecasts or master scheduled items, assuming these demands were selected for inclusion in the MPS regeneration and MRP pass through models, may be directly edited. If any edits are made, the user should instruct the system to regenerate the MPS before proceeding to MRP regeneration or apply real time. In the preferred embodiment, item demand quantities resulting exclusively from sales order or job orders may not be changed by editing the MPS table.

Figure 8:
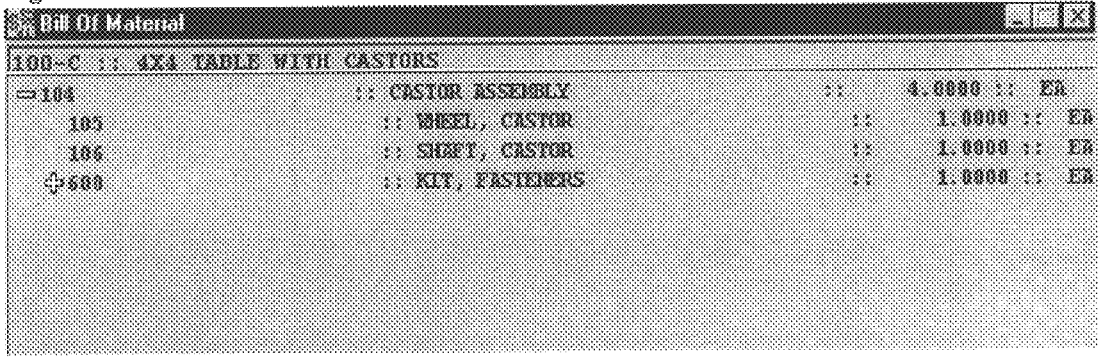
FIG. 8 shows a screen for viewing a bill of material.

As shown in FIG. 6, the user may display the Bill of Material for an MPS item by checking the Bill of Material box. This bill of material window is shown in FIG. 8. The BOM will be displayed level by level beginning with the first level. A "+" indicates that the shown component also has a Bill of material, and clicking on the + displays the next level components. A "−" indicates that the shown component has been exploded. Clicking on the—will collapse the BOM.

Figure 7:
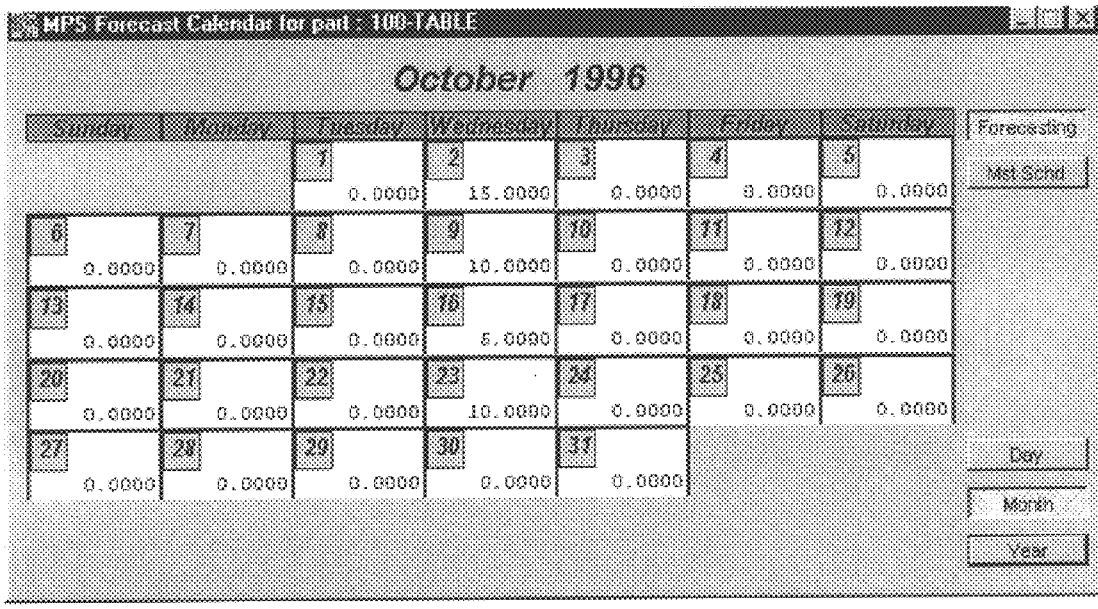
FIG. 7 shows an alternate screen which maybe used to display and edit MPS results after MPS regeneration in a calendar format.

As further shown in FIG. 6, the user may click the "MPS Calendar" box. When so selected, the forecast or master schedule for an item may be viewed in a calendar format as shown in FIG. 7.

At the conclusion of MPS, the user may print the MPS for all MPS items or only Master Schedule Items. Both selections can be sorted by part number (unique item identifier) or planner. In one embodiment, the report has a different format than the screen display. The following information is provided for every part number displayed on the report: UM, Rev, Prod. Class, Group Code, On hand Qty., Cumulative lead time, Planner, and MRP Pass Through Model. The three rows of data for each part are divided into 9 time buckets per row. The first two rows are weekly buckets and the last row are 2 week buckets. This provides for 36 weeks of MPS demand visibility. Each row is divided into four data elements:

Forecast: Total of independent forecast for that time period

Sales Orders: Total of Open Sales Order demand

Master Schedule: Quantity represents the total of independent demand that MRP will process for that time bucket. This number is dependent on the MRP Pass Through model of the item. If a Master Schedule quantity has been manually entered then that quantity will override the MRP Pass Through Quantity.

Over/Under Schedule: If MRP Pass Through model is "Master Schedule Item" then the Sales Order Quantity is subtracted from the Master Schedule Quantity. The resulting positive or negative value indicates if the Master Schedule quantity is meeting the demand.

MRP Regenerating

Figure 9:
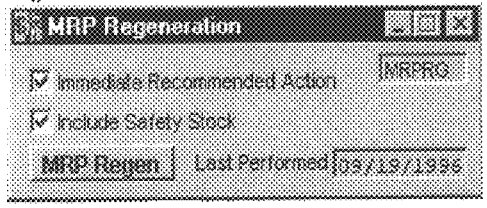
FIG. 9 shows a data entry screen for specifying MRP regeneration parameters.

After the user has finished browsing or editing the MPS table, the user may begin MRP regeneration by selecting this menu option. Upon selecting this option, the user is presented with the MRP regeneration option screen as shown in FIG. 9. This screen permits the user to specify two MRP options. Checking the Immediate Recommended Action box indicates that MRP is to assume that the user will take recommended action and therefore will process all dependent demand as if the action were already taken. This avoids having to process multiple MRP regenerations to see the result of actions taken. In one embodiment, checking this box does not actually change any dates on job or purchase orders. The user must still perform transactions to take recommended action. If the Include Safety Stock box is checked, this indicates that MRP should consider safety stock as demand. Safety stock demand is considered immediate. After these options are selected, the user may press the MRP Regen button to begin MRP regeneration.

Figure 10:
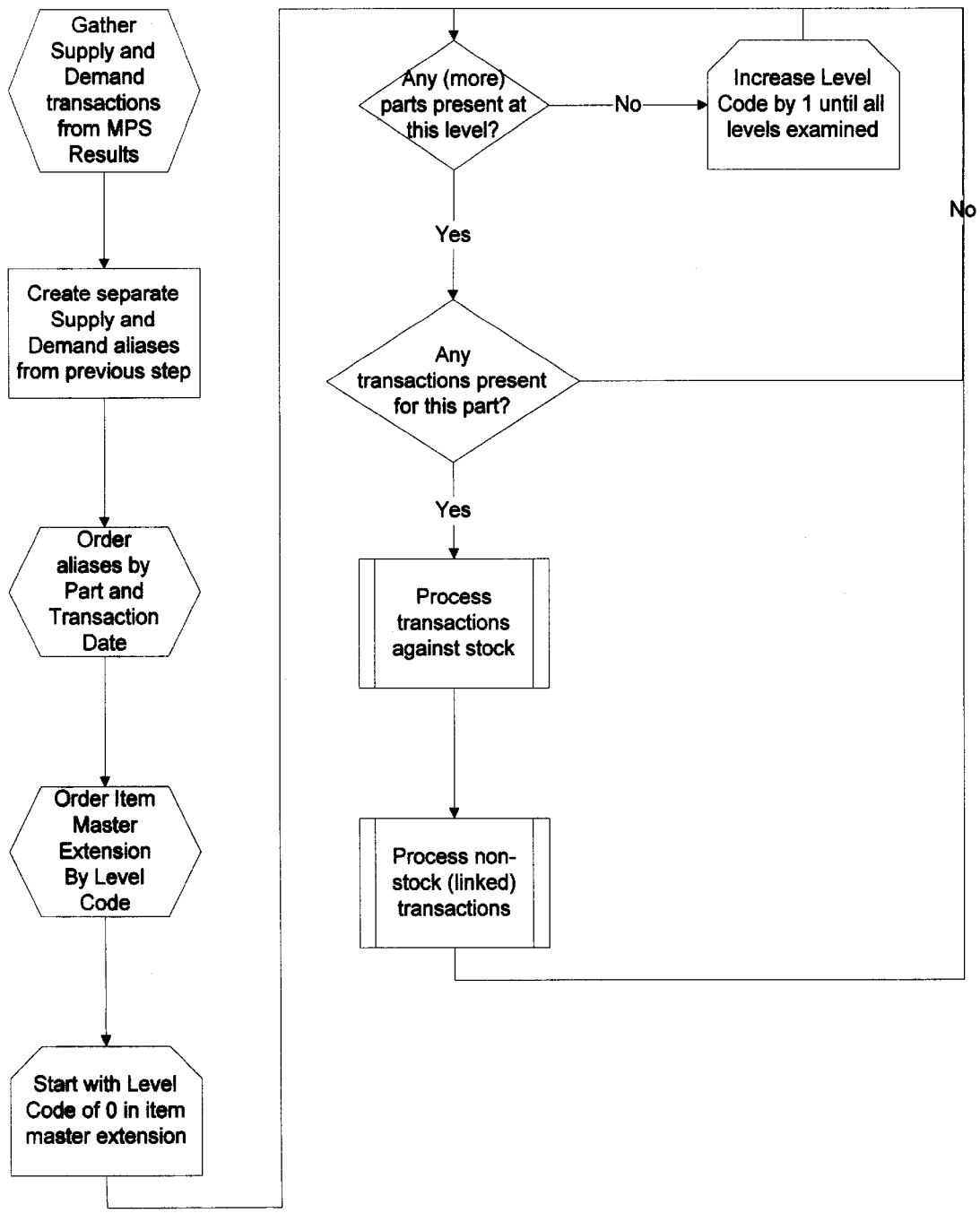
FIG. 10 is a flowchart showing an overview of the MRP regeneration process.

The steps used to perform MRP regeneration in one embodiment of the invention are shown in FIG. 10. In one embodiment, the MRP process begins by copying all records from the MPS results table to an MRP table, except for those MPS records specifying an item for which the exclude from MRP flag has been set (i.e., the field FLEXCMRP for the item in the item master extension file is TRUE). The fields FLPASSTHRU and FNTXNQTY are not used by MRP so these fields are not copied from the MPS table records to the MRP table records. In addition, the MRP table contains the field FNTXNBAL, which as explained below, is used for demand records to store the quantity of the demand that has been consumed by supply. This field is initially set to be equal to a records FNTXNQTY value for each newly created MRP table record. In an alternate embodiment, no MPS data set records are copied, but MRP directly processes the MPS data set. In this embodiment, either the records for which the exclude from MRP flag has been set should be first deleted, or these records should be made invisible to the MRP process, for example, by using a filtered index to eliminate such records. The term MRP data set, as used in the claims, includes either of these options or any other data base technique that results in the excluding such records from processing, if any such records exist in the MRP data set.

Optionally, a user may elect to include safety stock in performing MPS, as safety stock, is by definition, continuous demand. If the user specifies that safety stock should be used, then the system makes a single pass through the item master file. An indexed filter for those records which have a safety stock value may be used. For each item having a safety stock quantity, a demand record is inserted in the MRP data table with a transaction date of the date MRP regeneration is run, and a FNTXNQTY and FNTXNBAL values equal to the amount of safety stock.

In one embodiment, the record layout for the MRP table may be as follows:

| FIELD | TYPE | LEN | DEC | DESCRIPTION |
| --- | --- | --- | --- | --- |
| FCDOCITM | C | 3 | 0 | Document's Item Number |
| FCDOCNO | C | 10 | 0 | Document Number |
| FCDOCRLS | C | 3 | 0 | Document's Release Number |
| FCDOCTYPE | C | 2 | 0 | Document Type (SO, JO, PO, PL, SS, IF, MS, DD) |
| FCPARTNO | C | 25 | 0 | Part Number |
| FCSOURCE | C | 1 | 0 | Item's Replenishment Source |
| FCTXNTYPE | C | 2 | 0 | Transaction Type (ID, IF, SR, MS or DD) |
| FDTXNDATE | D | 8 | 0 | Transaction Date |
| FNTXNBAL | N | 10 | 4 | Transaction Balance - used to keep a running total of the demand |
| FNTXNQTY | N | 10 | 4 | Transaction Quantity |

Every time an MRP record is added, an entry is made in a separate MRP Navigation table having the following file layout.

| FIELD | TYPE | LEN | DEC | DESCRIPTION |
| --- | --- | --- | --- | --- |
| FIME | I | 4 | 0 | Me (Contains the record number of the recorded transaction) |
| FIPARENT | I | 4 | 0 | Parent (Contains the record number of the transaction which caused the 'Me' record to originate. if this field is 0 the record pointed to by 'Me' is a top level requirement.) |

For the initial records added to the MRP table, FIPARENT will be 0. However, as explained further below, during the MRP process, new records may be added to the MRP table, for example, as a result of exploding a bill of materials and inserting component parts. For such new records, the FIPARENT field will hold the record number of the MRP table record that caused the new MRP record to be created. This file allows a many-to-many relationship to be maintained between parent and child MRP table records.

In one embodiment, the MRP table is opened three times: once using an index that includes all records, once using "supply" alias, and once using two "demand" aliases. Filtered indices are utilized to create each alias. In one embodiment, the "supply" alias/filtered index is defined by those records for which FCTXNTYPE is equal to 'SR" (scheduled receipt) and the FCSOURCE field is "S" (stock). There are two demand aliases/filtered indices, one for stock demands and one for non-stock demands. The demand alias/filtered filtered index for stock transactions is defined by those records for which FCTXNTYPE is not "SR" and FCSOURCE is equal to "S" (stock) or "P" (phantom)." The demand alias/filtered index for non-stock transactions is defined by those records for which FCTXNTYPE is not "SR" and FCSOURCE is equal to "M" (make) or "B" (buy).

A "phantom" value for an item (FCSOURCE is "P") means that although there is a bill of materials having subcomponents for the item, the item is never actually sold as a complete unit. This is commonly the case for items sold as kits. For example, a computer manufacturer may have a top level bill of material item for a "computer," but because it offers different monitor options for computers, the computer item may be a "phantom." If a customer orders a computer, the manufacturer may always ship a system unit and a monitor. In this case the "computer" item, which is a top level item, may have a phantom FCSOURCE value, while the system unit and monitor items would have make FCSOURCE values.

Again referring to FIG. 10, next the MRP table, including the aliases, are ordered by item number and transaction date. Next, the item master extension file is ordered by low level code. Next, each record of the item master extension file is processed. For each such record, a seek is made on the MRP table (the unaliased version) to determine whether any MRP transactions exist for that item. If any such transactions exist, the transactions are processed as explained below. In one embodiment, those transactions present in the demand stock alias are processed before the transactions present in the demand non-stock alias. After all the transactions for an item are processed, the pointer in the item master file in incremented, and the process is repeated until all items having the highest low level code are processed. Then all items having the next lowest low level code are processed in similar fashion, and so on, until all items in the item master extension file have been processed. It will be appreciated by those skilled in the art that during this process, only a single pass is made through the item master extension file, and moreover, this pass will not look at items which may be in the item master file, but which are not in the item master extension file. This contributes to fast MRP regeneration time.

Figure 11:
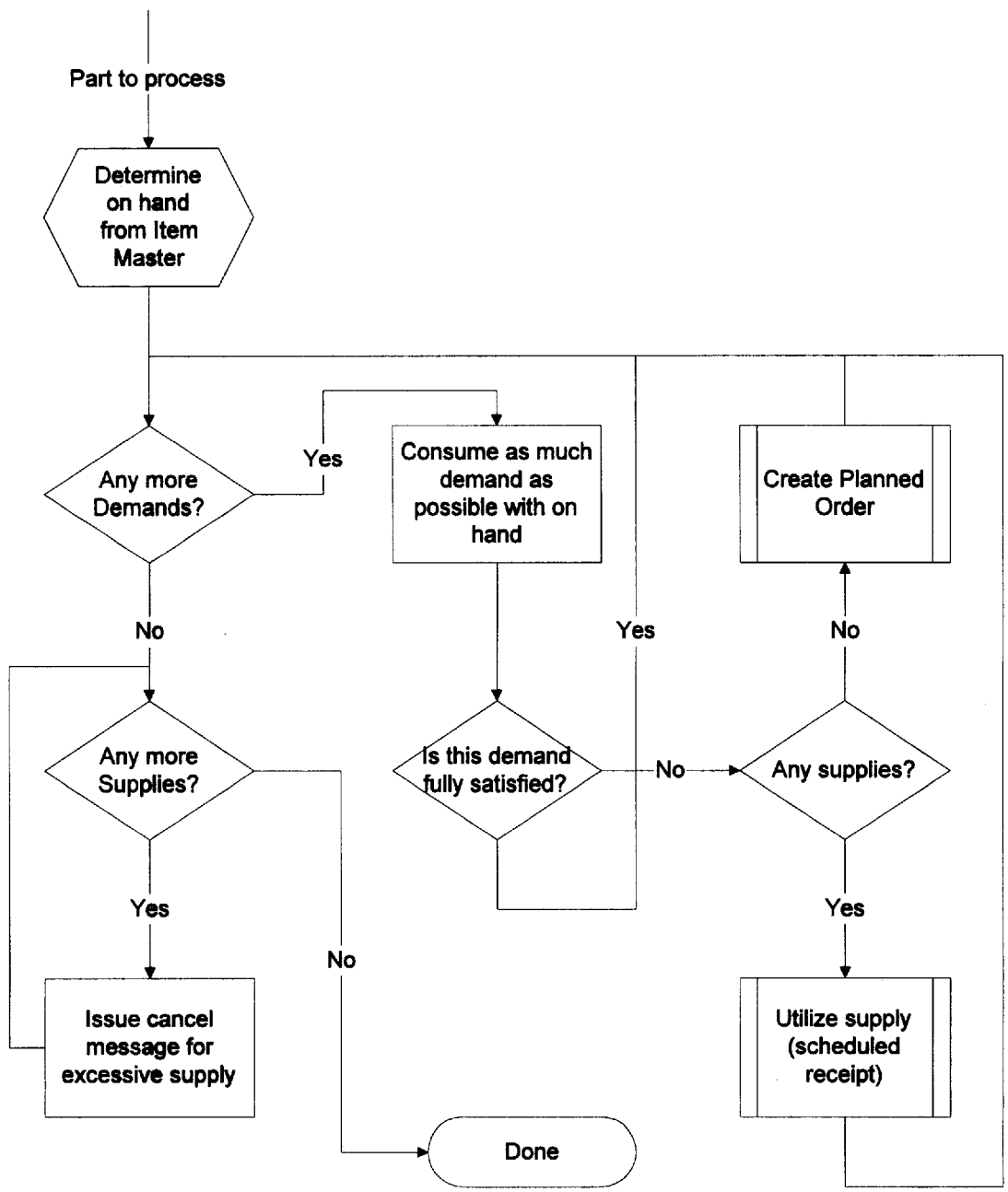
FIG. 11 is a flowchart showing the process in MRP for processing stock item transactions.
Figure 12:
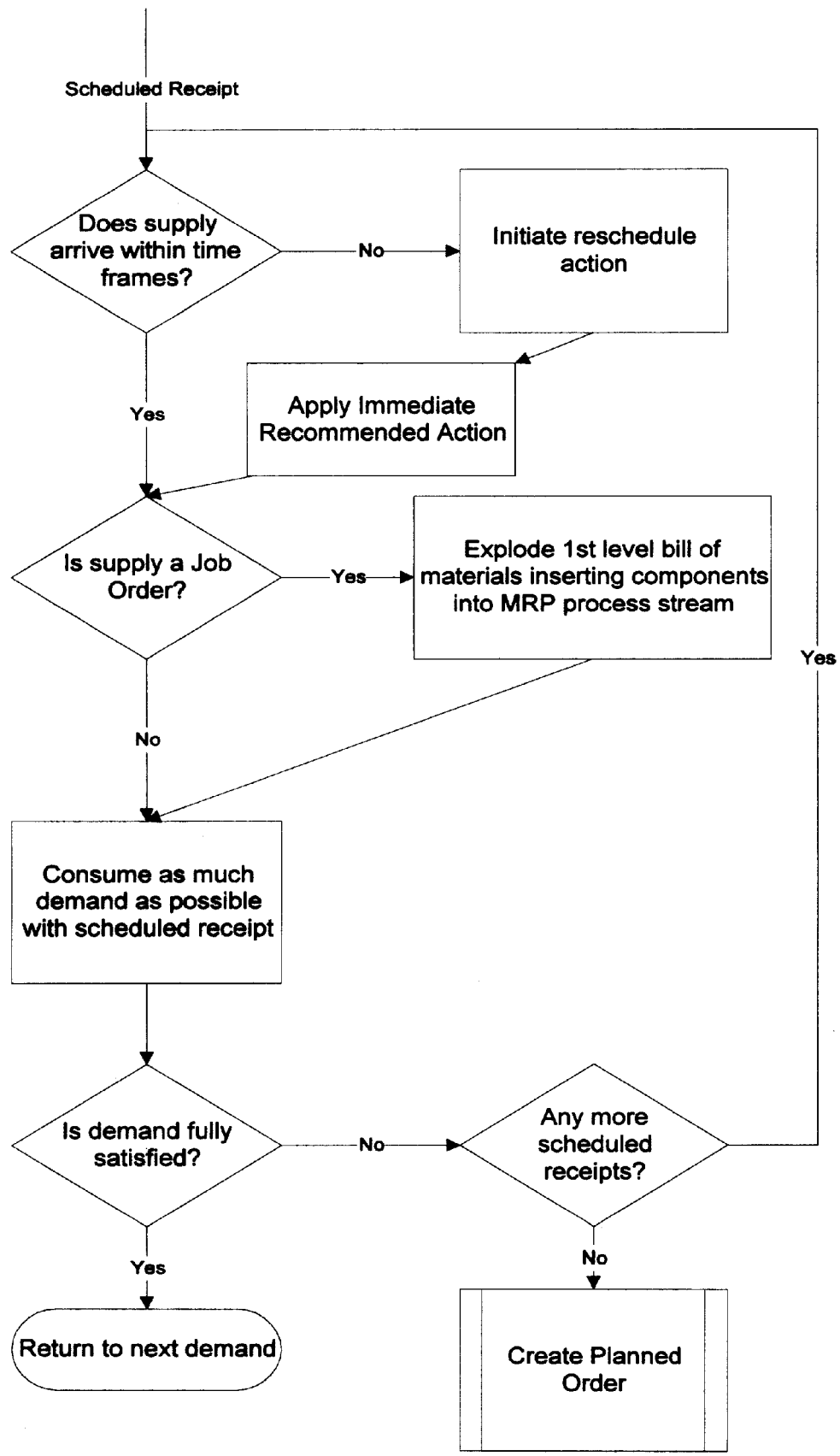
FIG. 12 is a flowchart showing the process in MRP for utilizing supply transactions to fulfill unmet demand(s) for items.
Figure 13:
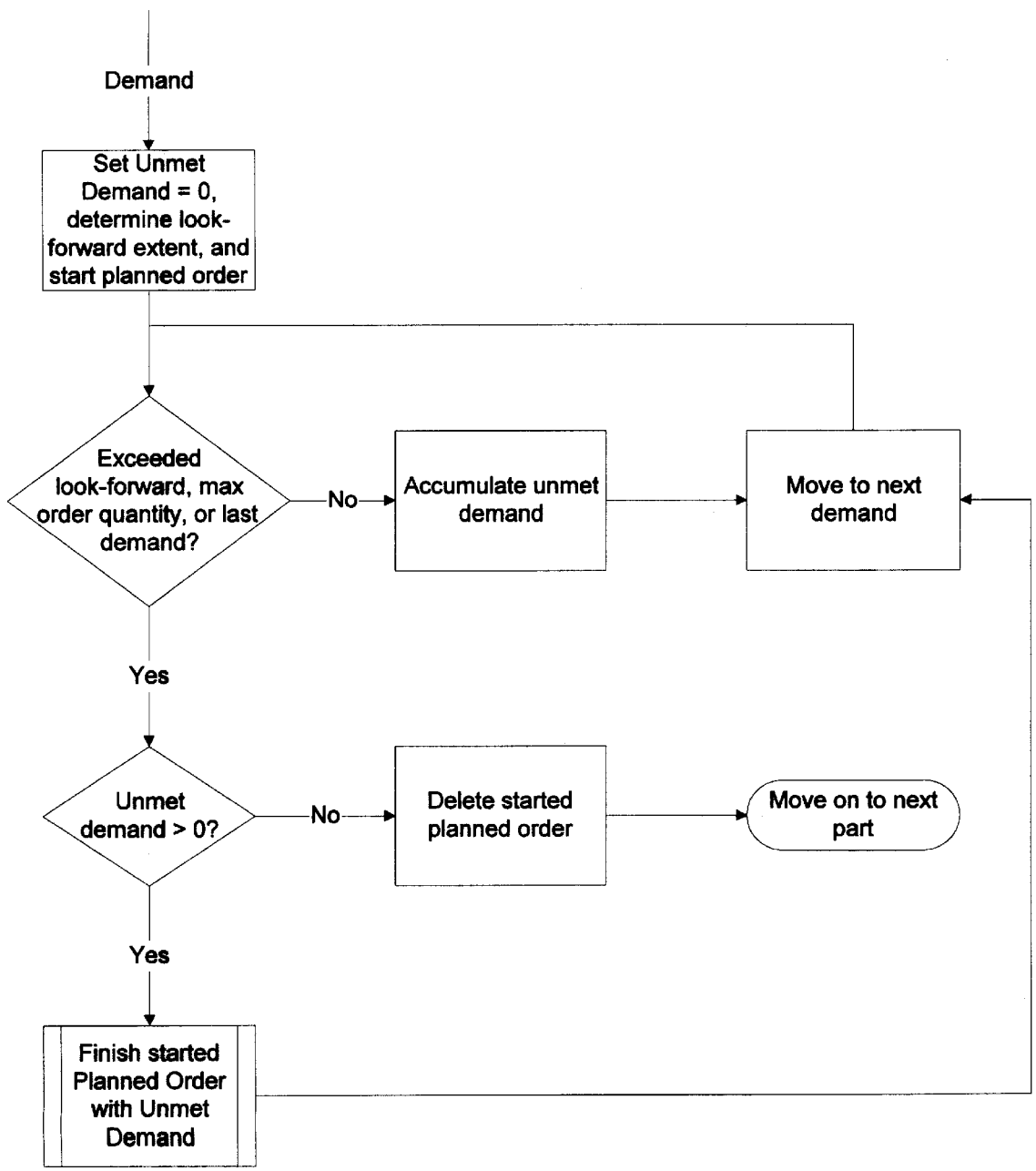
FIG. 13 is a flowchart showing the process for creating a planned order in order to fulfill unmet demand for an item.

As noted above, one step in MRP process is to process the supply and demand records in the MRP data set for each item. The sequence of one embodiment of this processing is shown in FIG. 11. As noted above, the records in the MRP table/data set that are stock transactions, meaning the system maintains an inventory quantity for them, may be designated, for example by the existence of an "S" in the FCSOURCE data field. When processing such items in the MRP table, as shown in FIG. 11, the first step is to determine and store the amount of the item on hand from the inventory field of the item master file. Next, the top of loop begins, and the first step in the loop is to determine whether there are any more demand records in the MRP table for the item. This may be accomplished by performing a seek for the item identifier on the stock demand alias of the MRP table. If an end of file is not returned, meaning that more demands for that item exist, then the system consumes as much of any specified demand as possible with what is on hand. There are many methods and algorithms well known in the art for consuming demand in MRP systems, and the particular mechanism used is at the discretion of the person implementing the system. In one embodiment the FNTXNBAL field in the MRP record being examined may be adjusted to the extent there is insufficient on-hand inventory. For example, if for an MRP stock demand record FNTXNQTY is 20, and there are 30 items in stock, then the FNTXNBAL for the demand record is reduced from 20 to 0, and the variable storing the supply is reduced from 30 to 10. If there were only 5 items in stock instead of 20, then the FNTXBAL of the demand record would first be reduced from 20 to 15. If the demand is not fully satisfied by consuming on hand inventory, then a seek is performed on the MRP table to identify the next supply record for the item identifier. Again, to the extent such supply records exist, (and multiple supply records may in the MRP table may be processed to ascertain the extent of the supply) then scheduled receipts are utilized to fulfill the demand, and the FNTXNBAL field of such supply records may be reduced by an amount equal to the unmet demand. This process for utilizing supply is shown in FIG. 12 and described further below. If the demand remains unsatisfied after processing all supply records in the MRP table for the item, then it is necessary to create a planned order action item, as shown in FIG. 13. If, during the step of consuming supply with amounts on hand, it is determined that sufficient inventory exists, then the system returns to the top of the loop and ascertains whether there are any further demands in the MRP file, and this process is repeated.

When all demand records for the item being examined have been processed, then a seek is performed on the supply alias of the MRP table to determine whether there are any more supply records for the item. If there are, then it means that the supply is not needed within the time frame under examination. Accordingly, an MRP action message is generated indicating that the supply should be canceled, or reduced. The system then returns to the top of the subloop and repeats the seek for the item in the supply alias to determine whether any supply records exist. When the seek is unsuccessful, the processing of MRP for that part is concluded, and program control returns to the process non-stock transactions section as shown in FIG. 10, and as described below.

The step of utilizing MRP supply records to fulfill the MRP demand records for an item is shown in FIG. 12. At this stage, any on-hand supply for the item will have been consumed, so there will be an unmet demand quantity for the item being processed. At this point, seek will be performed on the supply alias of the MRP table for the item identifier for which there is unmet demand. For a particular MRP supply record, the first step is to ascertain whether the supply arrives within the time frame required for the demand. For example, if there is a sales order (demand) for 10 widgets for Jan. 1, 1997, and there is a job order (supply) for manufacturing 5 widgets on Dec. 31, 1996, the supply will be deemed to arrive within the time frame, assuming the days early reschedule tolerance for the item is 1 day or more. Whether the supply arrives within the specified time frame will depend on the reschedule tolerances defined from the part in the item master extension. If the supply does not arrive within the time window to meet the demand, then an MRP action message to reschedule (expedite or delay) the supply transaction will be issued. This may be, for example, expediting the date of the MRP supply record to match the date of the demand. After the reschedule action has been completed, an optional process may be performed, depending on whether the user of the system has specified the "take immediate recommended action" option prior to performing the MRP regeneration. If this option has been selected, then the MRP processing continues based on the assumption that the user will take the action recommended by the MRP action message and expedite or delay the scheduled receipt. Accordingly, the FDTXNDATE field of the supply record being processed will be changed to the recommended rescheduled date.

Continuing with FIG. 13, after it has been determined whether a supply arrives within the time frame needed (and a reschedule action MRP message has been generated if it has not), the next step is to ascertain whether the supply is a job order (FCDOCTYPE is JO). If the document type is a job order, then the system explodes the level next the job order bill of material, and inserts into the MRP table new transaction records for the required subcomponents of the item. This will be done only for immediately lower level items of the item which is the subject of the supply record. The data fields for the new MRP record will be as follows.

FCDOCITM, FCDOCNO, FCDOCRLS will be set to the same values as the parent MRP record being processed. FCSOURCE will be set to the FCSOURCE value for the item in the bill of material being exploded. FCDOCTYPE and FCTXNTYPE will be set to DD, for dependent demand. FCPARTNO will be sent to the component part number, as defined by the bill of materials. FDTXNDATE will be, if the manufacturing/purchasing lead time for the component item is zero, set equal to FDTXNDATE of the parent item. If the manufacturing/purchasing lead time for the component item is not zero, then the lead time will be subtracted from the FDTXNDATE of the parent item walking the production calendar and used for the new MRP record. FNTXNBAL will be set to be equal to the parent FNTXNBAL, multiplied by the "number per" field in the bill of materials for the parent item.

Those of skill in the art will appreciate that such new records will, by definition, always have a low level code below that of the parent record being processed. Because the MRP table is being processed by item in the order of low level code, such new records will always be correctly processed, as no previously existing MRP records for the same item will have yet been processed. Accordingly, the integrity of MRP processing sequence is preserved.

As noted above, the system will at times necessitate the explosion of a bill of materials. In one embodiment, all standard bills of material are stored in a single file having self referencing references to parent and child components. Such a representative file layout is as follows.

| FIELD | TYPE | LEN | DEC | DESCRIPTION |
| --- | --- | --- | --- | --- |
| FBOMMEMO | M | 4 | 0 | Bom-level Memo |
| FCOMPONENT | C | 25 | 0 | Component Part No (Item Number) |
| FEND_EF_DT | D | 8 | 0 | Effective End Date |
| FITEM | C | 6 | 0 | Bom Item Number |
| FLEXTEND | L | 1 | 0 | Extend This Item's Qty. by the Parent Qty. |
| FLTOOLING | L | 1 | 0 | Is this a Tooling Item? |
| FMEMOEXIST | C | 1 | 0 | Memo Exist Does A Bom-level Memo Exist? ('y' = Yes) |
| FPARENT | C | 25 | 0 | Parent Part No. |
| FQTY | N | 14 | 5 | Quantity |
| FREQD | C | 1 | 0 | Flag If This Component Is Required - For Opt Bom |
| FST_EF_DT | D | 8 | 0 | Effective Start Date |

For top level items, the FPARENT field will be blank. Thus, it will be appreciated that this bill of materials file structure allows a plurality of bills of material to be specified in a single file, but there is no data redundancy. In particular, many different top level items may refer to a type of component that exists in different higher-level items. For example, if widget-A, widget-B and widget-C all have as a subcomponent contain an identical screw, there will be three records in the bill of material file in which the part number for the screw in which the FCOMPONENT field is the same, but in which the FPARENT field contains the part number of widget-A, widget-B and widget-C, respectively. A separate job order bill of materials file may also be used by the system that has the following representative file layout.

| FIELD | TYPE | LEN | DEC | DESCRIPTION |
| --- | --- | --- | --- | --- |
| FACTQTY | N | 14 | 5 | ACT QTY. Actual (not Rounded) Ftotqty |
| FBOMDESC | C | 65 | 0 | BOM DESC Description Of B.o.m. Part |
| FBOMINUM | C | 4 | 0 | BOM LINK Internal key used to link BOM |
| FBOMLCOST | N | 13 | 5 | LABR COST Total labor cost for all RTG opers for this part |
| FBOMMEAS | C | 3 | 0 | PART U/M Inventory Part Unit of Measure |
| FBOMOCOST | N | 13 | 5 | BOM COST |
| FBOMPART | C | 25 | 0 | Part In A Bill Of Material |
| FBOMREC | N | 6 | 0 | SO BOM NO Location In Sales Order B.o.m. |
| FBOMREV | C | 3 | 0 | BOM REV |
| FBOMSOURCE | C | 1 | 0 | Source |
| FBOOK | N | 14 | 5 | QTY COMMIT BOM Stock Parts Reserved Quantity 'N' - No components are lot controlled; 'S' - Some of the components are lot controlled; 'A' - All of the components require lot control |
| FCLOTEXT | C | 1 | 0 | Extent of Lot Contrl Extent of Lot control |
| FFIXCOST | N | 16 | 5 | FIX COST |
| FINUMBER | C | 3 | 0 | ITEM NUMBER |
| FITEM | C | 6 | 0 | BOM ITEM NO Item Number On Bill For Part |
| FJOBNO | C | 10 | 0 | Job Order Number |
| FLABCOST | N | 16 | 5 | LABR COST |
| FLABSETCOS | N | 16 | 5 | LABR SET COST |
| FLASTOPER | N | 4 | 0 | LAST OPER |
| FLEXTEND | L | 1 | 0 | EXT QTY FLG Should This Part's Unit Qty Be extended By its Par |
| FLLOTREQD | L | 1 | 0 | Lot Control Req'd Lot Control is req'd for this part |
| FLTOOLING | L | 1 | 0 | TOOL FLG Is This Part A 'tooling' Type Part? |
| FMATLCOST | N | 16 | 5 | MATL COST |
| FNEED_DT | D | 8 | 0 | NEED_DT Date Part Is Needed |
| FNRETPOQTY | N | 14 | 5 | Qty on Return P.O.s |
| FNUMOPERS | N | 4 | 0 | NUM OPS |
| FOTHRCOST | N | 16 | 5 | OTHR COST |
| FOVRHDCOST | N | 16 | 5 | OVRHD COST |
| FOVRHDSETC | N | 16 | 5 | OVRHD SET COST |
| FPARENT | C | 25 | 0 | Part That B.o.m. Has Been Created For |
| FPONO | C | 6 | 0 | PO NO Purchase Order Number |
| FPOQTY | N | 14 | 5 | PO QTY Purchased Quantity |
| FQTYTOPURC | N | 14 | 5 | Quantity which Needs To Be Purchased |
| FQTY_ISS | N | 14 | 5 | Qty Of Reserved That Has Been Issued From Stock |
| FRESPONSE | C | 1 | 0 | RESPONSE Assigned Responsibility For Delivery of Part C = CUSTOMER/ P = PURCHASING/M = MANUFACTURING |

-continued

| FIELD | TYPE | LEN | DEC | DESCRIPTION |
| --- | --- | --- | --- | --- |
| FSTDMEMO | M | 4 | 0 | STD MEMO Item Memo |
| FSUBCOST | N | 16 | 5 | SUB COST |
| FSUB_JOB | C | 10 | 0 | SUB_JOB If Bomsource = 'm', This is The Sub Job Created |
| FSUB_REL | L | 1 | 0 | SUB_REL FLG Has Job In Fsub_job Been Released |
| FTOTPTIME | N | 8 | 2 | TOT PROD TIME |
| FTOTQTY | N | 14 | 5 | TOT QTY BOM Quantity For A Part |
| FTOTSTIME | N | 8 | 2 | TOT SET TIME |
| FTRANSINV | N | 14 | 5 | TRANS QTY Purchased Qty Transferred Back To Inventory |
| FVENDNO | C | 6 | 0 | Vendor Number |

Next, the system consumes as much demand as possible with scheduled receipts. If the FNTXNBAL of the demand record is less than the FNTXNBAL of the supply record, then this field of the demand record is set to zero and this field of the supply record is reduced by the demand quantity. If FNTXNBAL values for both records are equal, then demand matches on-hand supply, and these fields of both demand and supply records are set to zero. In either of these cases, the demand is fully satisfied so processing of the MRP file continues with the next demand for the item in the MRP file, if one exists. If FNTXNBAL of the demand record is greater than the FNTXQTY, then FNTXNBAL of the demand record is is reduced by the FNTXNBAL of the supply record, and FNTXNBAL of the supply record is set to zero. Becuase the demand is not fully satisfied, then it is determined whether there are any more scheduled receipts by performing a seek on the supply alias of the MRP table. If there are more scheduled receipts, control returns to the top of the loop, and if not, then a planned order is created as described below.

The process for creating a planned order is shown in FIG. 13. At this point, a demand quantity for an item within a time frame is known, but all on-hand inventory, scheduled receipts, job orders and purchase orders for the item have been consumed. Becuase there may be multiple demands for the item in the MRP file (e.g., demand for 10 widgets on Jan. 1, and 15 widgets on Jan. 2), it is desireable to accumulate all such demands falling within a specified time frame, and create a single planned order covering all of them. The time frame will be dependent on the order policies for the items as stored in the item master extension file (e.g., FNMINORD, FNMLTORD, FNMAXORD, FNDAYSUP, etc.). This process is necessary so that dependent demand for items can be projected. The planned order to be created exists only for the purposes of the present MRP regeneration.

Figure 14:
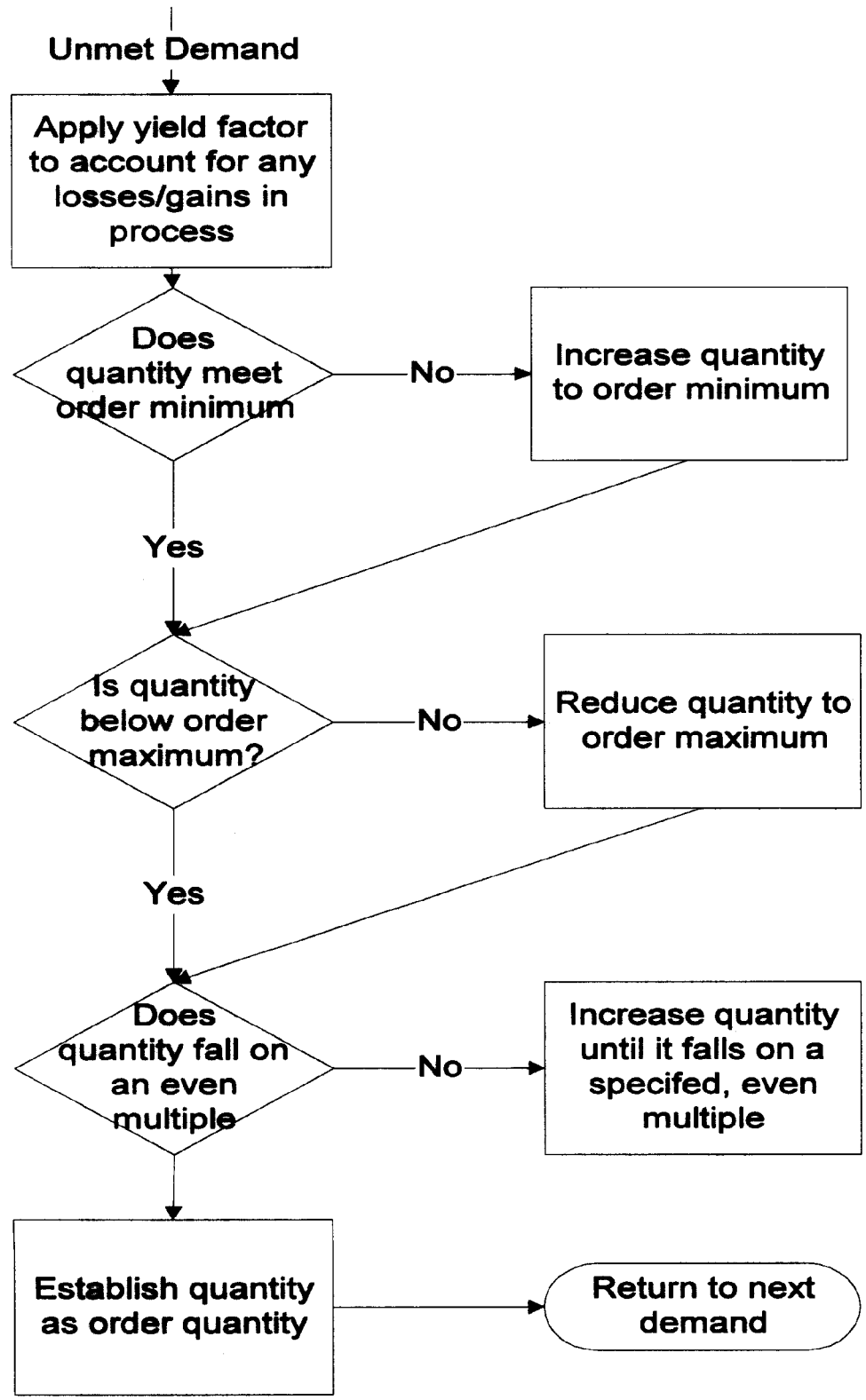
FIG. 14 is a flowchart showing the process for finishing a started planned order.

First, a local variable representing the unmet demand is set to zero, and the extent to which demand may be accumulated is ascertained based on the order policy variables of the item master extension record for the item. Subsequent demand records for the item are stepped through. For each demand record which is not inconsistent with the ordering policies, the unmet demand field (FNTXNBAL) of the demand record is added to the unmet demand local variable, and FNTXNBAL is set to zero. When a demand record is encountered that would cause the look-forward, maximum order quantity, or last demand contingencies to be violated, then it is determined whether the unmet demand is greater than zero. If it is, then the finish planned order procedure is implemented as shown in FIG. 14. If the accumulated unmet demand is not greater than zero, then the started planned order is deleted.

The result of the finish started planned order process shown in FIG. 14, is the insertion into the MRP table of a new MRP record for the item with the FCTXNTYPE of SR (scheduled receipt), and a an FCDOCTYPE of PL (for planned). This new record will not be subject to further processing, but it will be viewable by the user when the MRP results are displayed. Of course an MRP action message for the planned order will be generated.

Figure 15:
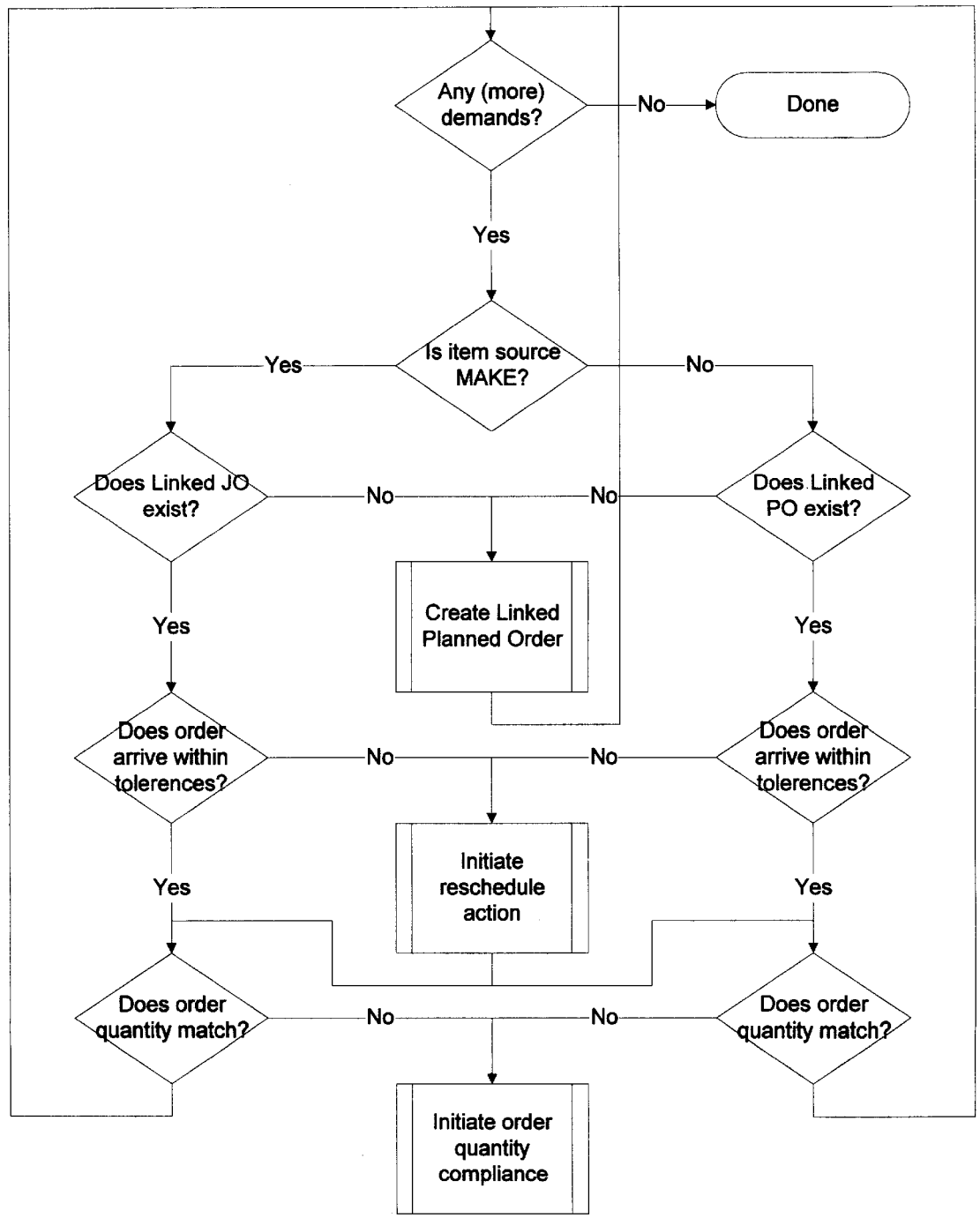
FIG. 15 is a flowchart showing the process in MRP for processing non-stock item transactions.

Referring again to FIG. 10, in one embodiment of the invention, after the stock transactions have been processed as described above, the next step in the MRP regeneration process is to process the non-stock transactions. This process is shown in FIG. 15, and begins at the top of a loop by performing a seek for the item identifier on the non-stock demand alias. If the seek is unsuccessful, the process stops. If a demand record is found, then the FCSOURCE field of the MRP record is examined to determine whether the items source is Make or Buy. If the item source is Make, then the system checks to see whether a job order is linked to the demand by searching for job order containing the demand's document number. Normally, there will be a linked job order. However, in some instances, there will not be a linked job order. For example, a demand for an may exist from a sales order, but, at the time MRP is run, a shop floor scheduler may not have yet created a job order based on the sales order. A similar check is made for a linked purchase order if FCSOURCE indicates the item source is not "M" for make. In either event if no linked job order or purchase order exists, then a linked planned order is created as described in FIG. 13. If a linked job order or purchase order does exist, then it is determined whether the supply document arrives within the the tolerances required by the demand, by comparing the FDTXNDATE field of the linked demand record with the FDTXNDATE field of the corresponding supply MRP record. If the supply time needs to be expedited or delayed, this action is taken using logic comparable to that for stock transactions, as discussed above. After the action is rescheduled, if necessary, it is determined whether the quantity of the demand matches the quantity of the supply for the linked document, by comparing the FNTXNQTY fields of the demand and supply records. If the supply quantity varies from the demand quantity, an MRP action message is generated indicating that the supply quantity for the job order or purchase order should be adjusted.

After all items having an item master extension record have been processed, MRP regeneration is complete. As noted above, at various points during MRP regeneration, MRP action messages may be created. In one embodiment, the MRP action messages comprise a data table to which records are inserted during MRP regeneration. Such a file may have the following record layout.

| FIELD | TYPE | LEN | DEC | DESCRIPTION |
| --- | --- | --- | --- | --- |
| FCDOCITM | C | 3 | 0 | Item Number |
| FCDOCNO | C | 13 | 0 | Document Number |
| FCDOCRLS | C | 3 | 0 | Release Number |
| FCPARTNO | C | 25 | 0 | Part Number |
| FCPRICOD | C | 2 | 0 | Priority Code Note that this fields uniquely identifies the action, however, it does not have any specific effect on order. |

-continued

| FIELD | TYPE | LEN | DEC | DESCRIPTION |
|---|---|---|---|---|
| FDACTDATE | D | 8 | 0 | Action Date This field determines the date on which an action should be taken. |
| FDDUEDATE | D | 8 | 0 | Due Date This date determines when the good contained in an order should be ready for use. In the case of Purchase Orders this is the last promise date and the due date for Job Orders. |
| FDTXNDATE | D | 8 | 0 | Transaction Date This date identifies the date of the original transaction. |
| FLACTTKN | L | 1 | 0 | Action Taken Flag |
| FMMSG | M | 4 | 0 | Action Message |
| FNTXNQTY | N | 10 | 4 | Transaction Quantity This field specifies the quantity which must appear on the order to bring the opertaion into material compliance. |

Figure 16:
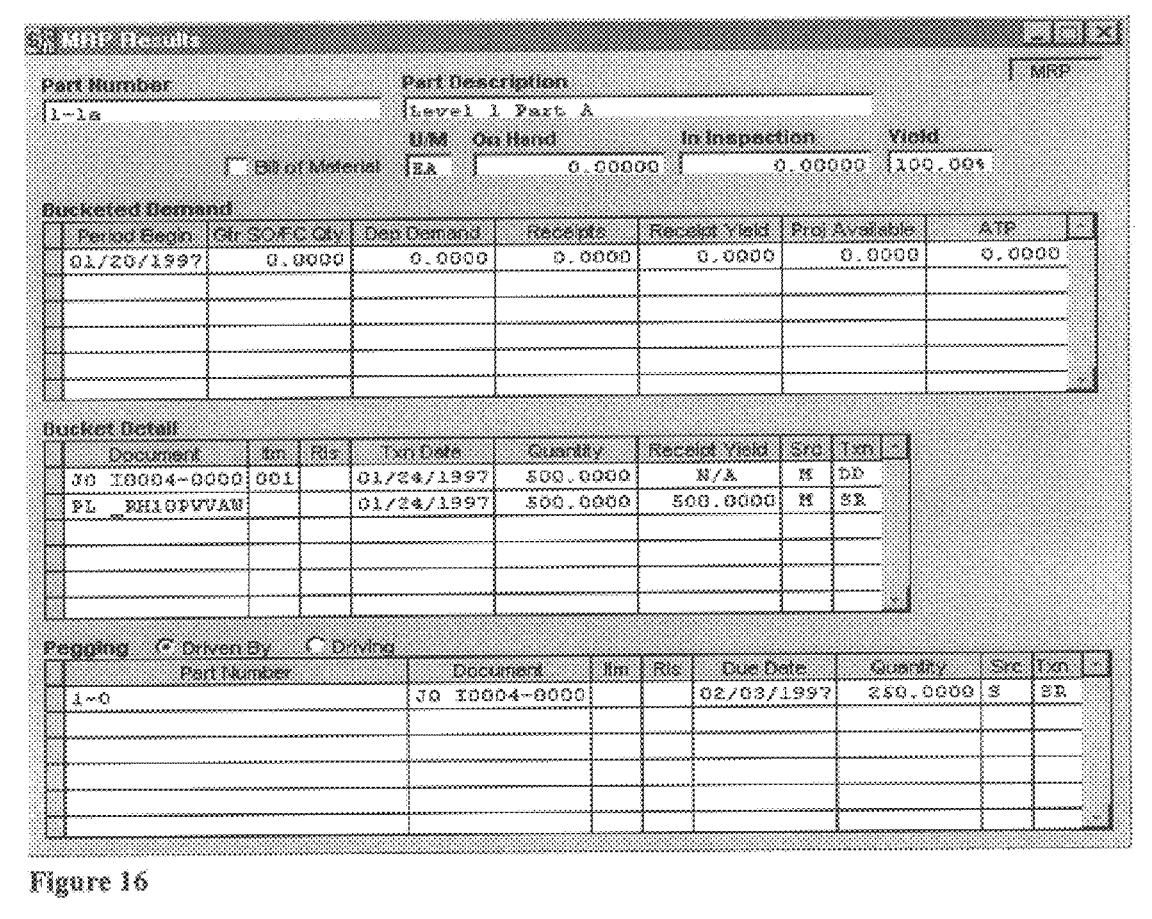

In one embodiment, these files may be examined by the MRP results screen as shown in FIG. 16. The screen is divided into 3 major areas: Bucketed Demand, Bucket Detail, and Pegging. The pegging grid is especially helpful when it is necessary to move out a job's scheduled receipt date due to delivery of material or capacity constraints.

The first grid on the MRP Results screen contains the bucketed demand for STOCK parts. No information is displayed in this area for Make, Buy or Non-standard items. Make/buy parts will show detail but no bucketed demand since no netting to inventory is performed for these parts.

Period Begin: First Day of week, month or year depending upon the display granularity setting for that part. The bucket size is dependent on the display granularity setting for the item. If no demand exists for a bucket that bucket is not displayed.

Gtr SO/FC Qty, Forecast Qty, SO Qty, or Mst Schd Qty: This label reflects the MRP Pass through Model selected for this item. Only items which have independent demand will display qty in this field.

Dep Demand: Qty of dependent demand for this item

Receipts: Receipts for Actual and Planned Purchase Orders or Job Orders for this item Receipt Yield: The number relative to the expected receipt quantity after applying the part yield factor Projected Available: (All receipts (planned and actual)+on hand inventory+In inspection Inventory)−(MRP pass through quantity+dependent demand)

ATP (Available to Promise): (On hand+Qty in inspection+Actual scheduled receipts)−(Independent demand and dependent demand which does not peg back to a forecast) No forecast demand nor any dependent demand originating from a forecast is considered in ATP calculation.

The bucket detail grid displays the detail of the aggregated demand for the bucket being pointed to in the Bucketed Demand grid. Detail will appear for make/buy items even when there is no bucketed demand quantities being displayed. The following table describes the various types of demands and scheduled receipts that may appear in the Bucketed Detail grid.

| Document | Demand or Supply | Source |
|---|---|---|
| SO | Independent Demand - Open SO | Sales Order Module |
| IF | Independent Forecast - Manual Input | MPS Calendar |
| MS | Master Scheduled - Manual Input | MPS Calendar |
| SS | Safety Stock | Item Master Extension |
| JO | Scheduled Receipt - OPEN/REL Job | Shop Floor |
| PO | Scheduled Receipt - OPEN PO | Purchasing |
| DD | Dependent Demand | Upper Level (parent) requirement |
| PL | Planned Order | MRP net requirement |

In one embodiment, the system of the present invention will assign a system ID number to Planned Orders Documents, forecast, and master schedule demand. This number is internal only and does not become the JOB or PO number. Other data displayed on this screen are as follows.

Date: Due date of document referenced.

SRC: Source-Make, Buy, or Stock

Txn: Indicates the type of transaction: ID Ind. Demand, DD Dep Demand, and SR Sched Rcpt The Pegging grid is relative to the Bucket Detail selection. Driven By: Displays the planned or actual parent demand which is driving this requirement Driving: Displays the actual or planned requirements that are a direct result of the Bucket Detail Right clicking on the part number in the pegging grid transfers the user directly to the MRP results screen for that part. In this way, a user may quickly peg through multi-levels. Right clicking on the document number in the pegging grid transfers the user directly to the document.

As mentioned above, one output of MRP regeneration are MRP action messages. The system may present such action messages to the user via the screen shown in FIG. 17. The MRP Action Message screen only displays parts for which MRP has determined that action needs to be taken. The information displayed is as follows:

Document: Identifies what record needs action.

Txn Date: Date which currently exists on the record. This field is not updateable.

Act. Date: Date by which action should be taken.

Action Date for create order messages is the due date minus the purchase lead time or manufacturing lead time of the item, considering the production calendar.

Due Date: Due date suggested by MRP which will satisfy demand.

Quantity: Qty suggested by MRP based on net requirement and order policies.

Act: This field will display DO or DONE depending if message has been acted upon.

Sel: Check box to indicate that the user wishes to take action on this message. Multiple action messages may be selected by clicking on these boxes. Then, upon clicking the Take Selected Action button, the system will transfer the user directly to the document referenced by the action message or to the module where creation of an order has been suggested. If, for example the action is to create a new purchase or job order, the order form will be automatically populated with the existing data necessary for completion of the form.

Message: MRP generated message indicating what kind of action needs to be taken.

In one embodiment, action messages fall into basic types:
1. Create a new Job Order for a specified quantity and date
2. Create a new Purchase Order for specified quantity and date 3. Expedite or Delay existing Job Order or Purchase Order to a specified date
4. Cancel a Job Order or Purchase Order
5. Adjust Qty of Job or Purchased Order Low Level Code Maintenance As noted above, maintenance of a low level code for an item is an important part of an MRP system. In contrast to some prior systems that maintain separate low level codes for the same item in different bills of material, in one embodiment, the present invention maintains a single low level code. The low level code for an item may be maintained in the item master extension file as noted above. As bills of material (standard or job order) are modified, the low level code may change. Accordingly, one embodiment of the present invention invokes a routine to update the low level code whenever a bill of material (standard or job order) is created or modified.

Figure 17:
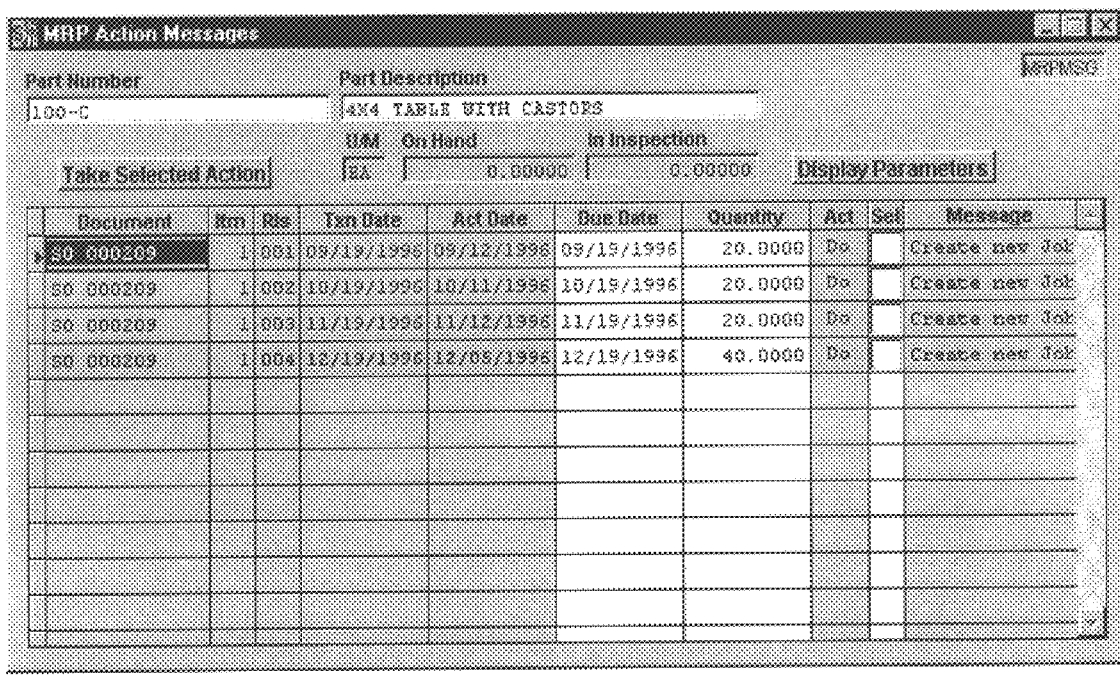
FIG. 17 is a screen for viewing MRP action messages and for taking actions based on MRP results.
Figure 18:
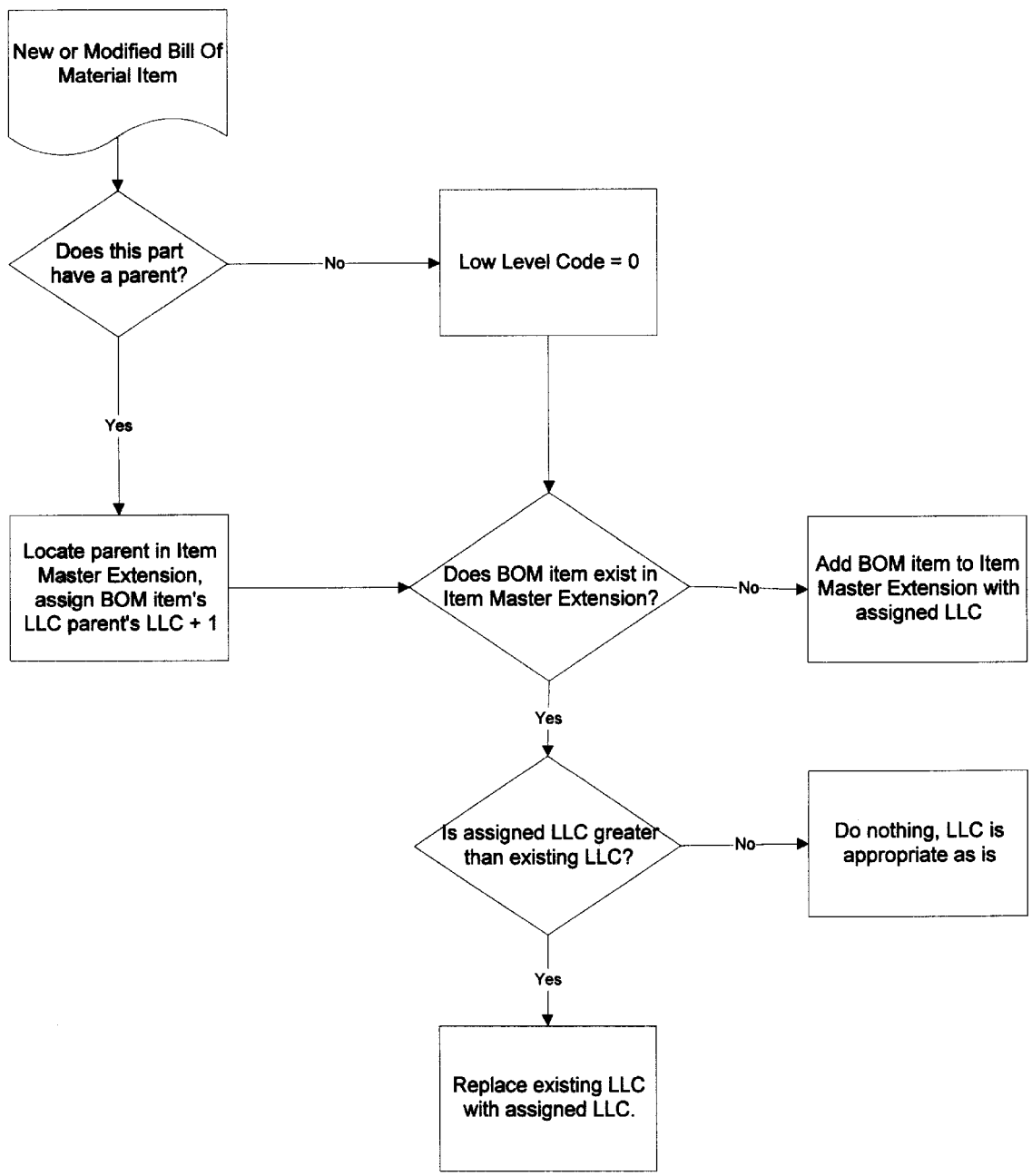
FIG. 18 is a flowchart showing the process for updating low level codes for items in real time.

One embodiment of this routine is shown in FIG. 17. The process begins with a bill of materials record for a particular item. The first step is to examine the bill of materials record to ascertain whether the item has a parent item. If not, then the low level code is tentatively set to zero. If there is a parent item, then the item master extension file is accessed to obtain the low level code for the parent item, and the item's low level code is tentatively set to one greater than its parent's low level code. Next, a seek on the item number is done on the item master extension file to ascertain whether an item master file record already exists for the item. If no such record exists, an item master extension file record is created using default values for the item number and assigned the tentative low level code, and the process is complete. If an item master extension record for the item already exists, then it is determined whether the tentative low level code for the item in the item master extension file is greater than the tentatively calculated low level code. If the existing low level code is not greater than no further processing occurs. If the tentative low level code is greater than the existing low level code in the item master extension file, then its value in the item master extension file is replaced with the tentatively calculated low level code.

By updating the low level code in "real time" as explained above, it is unnecessary for low level codes to be calculated during or prior to MRP regeneration. This contributes to faster MRP regeneration time.

In the claims, the term low level code refers to a method for hierarchically distinguishing components of an item. The term "higher" low level code is used to refer to where the item exists in the hierarchy of a bill of material, whereas the actual value used to represent the hierarchy may be different. For example, the industry convention is to use a low level code of "0" to represent a "top level" item, which frequently is a finished item which a customer may order, and a low level code of "1," to represent the next (lower) level of subcomponents. Thus, "0" is the "higher" low level code, even though, numerically, 0 is less than 1. Although it would be contrary to the industry practice, one could, for example, designate "1,000" or the letter "A" as the "highest" low level code, and "999" or "B" as the second level code for subcomponents. The terms higher and lower, when used in the claims, refer the to relative hierarchy of the code used as described above, and not to the actual numerical (or other data type) values used to represent the hierarchy.

Non-Orlickian MRP

Those of skill in the art will appreciate that conventional MRP systems are used in manufacturing environments in which, upon completion of manufacture of items specified in a job order, this data is entered into the system. One consequence of such conventional systems is that the on-hand inventory amount for the newly manufactured item is increased. The system of the present invention may also include such a job order completion data entry means for recording when a job order has been manufactured. However, the present job order completion means is operable, if the job order indicates that the item manufactured is a make item, to refrain from altering the inventory quantity for the item in the item master file. The same is true for buy-to-order purchase orders. When a shipment is received for an item ordered specially for a buy-to-order transaction, the shipment receipt data entry means does not add the amount received to inventory.

What is claimed is:

1. An improved MRP system comprising:

at least one item demand data set;

at least one item supply data set;

means for generating a Master Production Schedule ("MPS"), the means for generating being operable to perform the step of:

creating an MPS data set comprising data from the item demand and item supply data sets; and wherein each such MPS data set record includes data indicating:

an item identifier;

a quantity;

a transaction time period; and a "pass-through flag" which is set for those item supply records for which there is no independent demand in the MPS file for the same item;

such that the means for generating ensures that the MPS data set includes item supply information for items for which there is no independent demand;

means for viewing data in the records in the MPS data set for which the pass-through flag has not been set prior to performing materials requirement planning ("MRP");

means for performing time phased MRP netting on the MPS data set to thereby generate MRP action messages; and such that means for generating ensures that it is unnecessary for such MRP netting means to access data from the item supply data set.

2. The MRP system of claim 1 further comprising:

an item data set wherein each record is uniquely identified by an item identifier, and wherein the item data set further comprises a low level code associated with each unique item identifier on which MRP is to be performed.

3. The MRP system of claim 2 further comprising:

a second item data set wherein each record is uniquely identified by an item identifier, and wherein each record stores non-MRP data for the item, and further comprising means for browsing item records in the second item data set.

4. The MRP system of claim 3 further comprising:

at least one bill of material data set defining parent-child relationships among items to thereby define a plurality of bills of material for items; and wherein the first item data set comprises, for each item record in the file, a single low level code for the item.

5. The MRP system of claim 1 further comprising:

a first item data set wherein each record is uniquely identified by an item identifier, and a second item data set wherein each record is uniquely identified by an item identifier, and wherein each record stores non-MRP data for the item, and, means for browsing item records in the second item data set.

6. The MPS system of claim 1 wherein:

the step for creating the MPS data set comprising information from item demand and supply information further comprises the steps of:

inserting all demand records into the MPS data set before inserting supply records into the MPS data set.

7. The MPS system of claim 6 wherein each item identifier is the subject of a supply record, and wherein the need for setting the pass-through flag for a particular supply record in the MPS data set is determined by the means for generating a Master Production Schedule by performing a seek operation to ascertain whether any record for the item identifier which is the subject of the supply record already exists as a demand in the MPS table.

8. The improved MPS system of claim 1 wherein the MPS data set records for which the source of the supply or demand is a sales order, job order, purchase order document, further comprises a reference uniquely identifying the sales order, job order or purchase order document.

* * * * *